(12) United States Patent
Hayakawa et al.

(10) Patent No.: US 7,485,379 B2
(45) Date of Patent: Feb. 3, 2009

(54) MAGNETIC RECORDING MEDIUM

(75) Inventors: Satoru Hayakawa, Kanagawa (JP); Katsuhiko Meguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 631 days.

(21) Appl. No.: 11/185,676

(22) Filed: Jul. 21, 2005

(65) Prior Publication Data

US 2006/0019123 A1  Jan. 26, 2006

(30) Foreign Application Priority Data

Jul. 23, 2004  (JP)  ............... P.2004-215356

(51) Int. Cl.
G11B 5/64  (2006.01)

(52) U.S. Cl. ............... 428/847.4; 428/847.2; 428/423.7

(58) Field of Classification Search ................. 428/840, 428/840.1, 847, 847.1, 847.2, 847.3, 847.4, 428/847.7, 848.2, 423.7, 425.5, 220, 480, 428/141, 692.1, 900; 360/134, 135
See application file for complete search history.

(56) References Cited

U.S. PATENT DOCUMENTS

| 6,713,155 | B1 * | 3/2004 | Handa et al. | ............. 428/847.4 |
| 7,022,396 | B1 * | 4/2006 | Kubota et al. | ............... 428/141 |
| 7,048,994 | B2 * | 5/2006 | Kosuge et al. | ............. 428/220 |
| 2003/0180578 | A1 * | 9/2003 | Hayakawa et al. | .......... 428/847 |

FOREIGN PATENT DOCUMENTS

| JP | 57-42890 | B2 | 9/1982 |
| JP | 60-127523 | A | 7/1985 |
| JP | 60-38767 | B2 | 9/1985 |
| JP | 60-246919 | A | 12/1985 |
| JP | 2000-57558 | A | 2/2000 |
| JP | 2004-39052 | A | 2/2004 |
| WO | WO 0114462 | * | 3/2001 |
| WO | WO 02066250 | * | 8/2002 |

\* cited by examiner

*Primary Examiner*—Carol Chaney
*Assistant Examiner*—Louis Falasco
(74) *Attorney, Agent, or Firm*—Sughrue Mion, PLLC

(57) ABSTRACT

A magnetic recording medium comprising: a magnetic layer; a first radiation curable resin layer; a non-magnetic support having an intrinsic viscosity of from 0.47 to 0.51 dL/g; and a second radiation curable resin layer, in this order, wherein the first radiation curable resin layer contains a filler, and the second radiation curable resin layer contains a filler.

14 Claims, No Drawings

MAGNETIC RECORDING MEDIUM

FIELD OF THE INVENTION

The present invention relates to a magnetic recording medium. In detail, the invention relates to a high-density magnetic recording medium which is high in output and excellent in durability.

BACKGROUND OF THE INVENTION

In recent years, in the field of magnetic recording, digital recording which is less in deterioration of recording is developing towards practical use in place of conventional analog recording. Recording and reproducing units and magnetic recording media which are used for the digital recording are required to have high image quality and high tone quality, and needs for realizing size reduction and space saving are increasing. However, in general, the digital recording is required to achieve recording with a number of signals as compared with the analog recording. For that reason, magnetic recording media which are used in the digital recording are required to achieve recording with still more high density.

In order to achieve the foregoing high-density recording, it is essential to make the wavelength of a recording signal short and to make the recording track narrow. Accordingly, in addition to the technology for granulating and highly packing a ferromagnetic power and the technology for smoothing the surface of a magnetic recording medium, there has hitherto been developed the technology for thinning a magnetic recording medium for the purpose of enhancing a volume density.

As the foregoing technology for thinning a magnetic recording medium, there have been known so far a method for thinning a non-magnetic support and a method for thinning a non-magnetic layer. However, the method for thinning a non-magnetic support involved a problem that when the thickness becomes smaller than a prescribed value, durability of the non-magnetic support is lowered.

On the other hand, the method for thinning a non-magnetic layer involved problems, for example, a lowering of output, an increase of dropout, and an increase of error rate, because the magnetic layer is likely influenced by the surface of the non-magnetic support. That is, if thinning of the magnetic recording medium for the purpose of increasing the recording density is advanced, there was encountered a problem that a sufficient leveling effect against the non-magnetic support is not obtained in the magnetic layer, the surface state of the non-magnetic support as provided beneath the magnetic layer or non-magnetic layer largely influences the surface of the magnetic layer so that projections are formed on the surface of the magnetic layer, thereby causing an error rate, etc. In particular, in a linear recording system, since a magnetic tape runs substantially parallel to a head and comes into contact with the magnetic head, dropout due to projections present on the surface of the magnetic layer is likely generated.

In order to solve the foregoing problems involved in thinning a magnetic recording medium, it was necessary to suppress influences of the surface of the non-magnetic support in the state of keeping durability of the non-magnetic support. From these viewpoints, there have been known so far base films for recording medium in which a variety of fillers are contained in the non-magnetic support to suppress influences of the surface state of the non-magnetic support (see JP-A-60-127523, JP-A-60-246919 and JP-A-2000-57558, etc.).

However, by only containing these fillers in the non-magnetic support, it is impossible to thoroughly suppress influences of the surface state of the non-magnetic support against the magnetic layer. In some case, characteristics of the non-magnetic support are largely changed. Accordingly, it could not be said that this means is effective from the viewpoint of keeping durability of the non-magnetic support.

On the other hand, there is also developed a magnetic recording medium in which an undercoat layer is provided between a non-magnetic support and a magnetic layer, or between a non-magnetic support and a non-magnetic layer, thereby suppressing influences of the surface state of the non-magnetic support against the magnetic layer (see JP-B-57-42890 and JP-B-60-38767, etc.).

However, though a polyester based resin is used for such an undercoat layer, such a construction involves a problem that rigidity of the medium is lowered so that durability is deteriorated.

Incidentally, the following JP-A-2004-39052 discloses a magnetic recording medium comprising a non-magnetic support having a smoothed layer and a magnetic layer containing a ferromagnetic powder and a binder in this order on at least one surface thereof, wherein the thickness of a filler to be contained in the non-magnetic support is from 0.5 to 5 nm, an aspect ratio of a mean particle size to the thickness of the filler is from 50 to 10,000, and the thickness of the smoothed layer is from 0.3 to 3 µm.

However, according to the construction as described in JP-A-2004-39052, while influences of the surface state of the non-magnetic support against the magnetic layer are suppressed due to contribution of the smoothed surface, there was involved a problem that rigidity of the medium is lowered so that durability is deteriorated.

SUMMARY OF THE INVENTION

In view of the foregoing problems, the invention has been made and is aimed to provide a high-density magnetic recording medium which is high in output and excellent in durability.

The invention is as follows.

(1) A magnetic recording medium comprising a non-magnetic support having an intrinsic viscosity of from 0.47 to 0.51 dL/g, a first radiation curable resin layer on one surface of the non-magnetic support, and a second radiation curable resin layer on the other surface of the non-magnetic support, with a magnetic layer being at least provided on the first radiation curable resin layer, wherein the first and second radiation curable resin layers contain a filler.

(2) The magnetic recording medium as set forth above in (1), wherein a back layer is provided on the second radiation curable resin layer, the back layer has a surface roughness (SRa) of from 2 to 5 nm, and the magnetic layer has a surface roughness (SRa) of from 1 to 4 nm.

According to the invention, a high-density magnetic recording medium which is high in output and excellent in durability is provided.

DETAILED DESCRIPTION OF THE INVENTION

The magnetic recording medium of the invention will be described below in more detail.

[Non-Magnetic Support]

Examples of the non-magnetic support which is used in the invention (hereinafter sometimes referred to simply as "support") include biaxially stretched polyethylene naphthalate, polyethylene terephthalate, polyamides, polyimides, polyamideimides, aromatic polyamides, and polybenzoxidazole.

Of these, polyesters comprising a dicarboxylic acid and a diol, such as polyethylene terephthalate and polyethylene naphthalate are preferable. The invention will be described below while making the case of using a polyester film as the preferred support as an example.

Examples of the dicarboxylic acid component which is the major constituent component of the polyester include terephthalic acid, isophthalic acid, phthalic acid, 2,6-naphthalenedicarboxylic acid, 2,7-naphthalenedicarboxylic acid, diphenylsulfonedicarboxylic acid, diphenyl ether dicarboxylic acid, diphenylethanedicarboxylic acid, cyclohexanedicarboxylic acid, diphenyldicarboxylic acid, diphenylthioether dicarboxylic acid, diphenyl ketone dicarboxylic acid, and phenylindancedicarboxylic acid.

Furthermore, examples of the diol component include ethylene glycol, propylene glycol, tetramethylene glycol, cyclohexanedimethanol, 2,2-bis(4-hydroxyphenyl)propane, 2,2-bis(4-hydroxyethoxyphenyl)propane, bis(4-hydroxyphenyl)sulfone, bisphenol fluorene dihydroxyethyl ether, diethylene glycol, neopentyl glycol, hydroquinone, and cyclohexanediol.

Of the polyesters comprising these components as the major constituent components, polyesters comprising, as the major constituent components, terephthalic acid and/or 2,6-naphthalenedicarboxylic acid as the dicarboxylic acid component and ethylene glycol and/or 1,4-cyclohexanedimethanol as the diol component are preferable in view of transparency, mechanical strength, dimensional stability, etc.

Above all, polyesters comprising polyethylene terephthalate or polyethylene-2,6-naphthalate as the major constituent component, copolymerization polyesters comprising terephthalic acid, 2,6-naphthalenedicarboxyl acid and ethylene glycol, and polyesters comprising a mixture of two or more kinds of these polyesters as the major constituent component are preferable. Polyesters comprising polyethylene-2,6-naphthalate as the major constituent component are especially preferable.

Furthermore, so far as the effects of the invention are not hindered, the polyester may be further copolymerized with other copolymerization component or mixed with other polyester. Examples thereof include the foregoing dicarboxylic acid components and diol components, or polymers composed of the same. Additionally, in order that delamination may hardly occur, an aromatic dicarboxylic acid having a sulfonate group or an ester forming derivative thereof, a dicarboxylic acid having a polyoxyalkylene group or an ester forming derivative thereof, a diol having a polyoxyalkylene group, or the like may also be copolymerized. Of these, 5-sodium sulfoisophthalate, 2-sodium sulfoterephthalate, 4-sodium sulfo-2,6-naphthalenedicarboxylic acid, and compounds resulting from substitution of sodium of such a compound with other metal (for example, potassium and lithium), an ammonium salt, a phosphonium salt, etc. or ester forming derivatives thereof, polyethylene glycol, polytetramethylene glycol, a polyethylene glycol-polypropylene glycol copolymer, and compounds resulting from conversion of the both terminal hydroxyl groups thereof into a carboxyl group upon oxidation or the like are preferable in view of polymerization reactivity of the polyester and transparency of the film. For this purpose, a copolymerization proportion is preferably from 0.1 to 10% by mole based on the dicarboxylic acid constituting the polyester.

Moreover, for the purpose of enhancing heat resistance, it is possible to copolymerize a bisphenol based compound or a naphthalene ring- or cyclohexane ring-containing compound. For this purpose, a copolymerization proportion is preferably from 1 to 20% by mole based on the dicarboxylic acid constituting the polyester.

A synthesis method of the polyester which is used in the support of the invention is not particularly limited, and the polyester can be produced according to conventionally known production processes of polyester. Examples thereof include a direct esterification method for directly esterifying the dicarboxylic acid component with the diol component; and an ester exchange method for first subjecting a dialkyl ester as the dicarboxylic acid to ester exchange reaction with the diol component and heating the reaction product in vacuo to remove the excessive diol component, thereby achieving polymerization. In this case, if desired, an ester exchange catalyst or a polymerization reaction catalyst can be used, or a heat resistant stabilizer can be added.

Furthermore, one or two or more kinds of various additives such as an anti-coloring agent, an antioxidant, a crystal nucleating agent, a lubricating agent, a stabilizer, an anti-blocking agent, an ultraviolet absorber, a viscosity modifier, a defoaming transparentizing agent, an antistatic agent, a pH modifier, a dye, and a pigment may be added.

The support in the invention must have an intrinsic viscosity of from 0.47 to 0.51 dL/g. When the instric viscosity is less than 0.47 dL/g, since the degree of polymerization is low, the film forming properties and strength are not enhanced. On the other hand, when it exceeds 0.51 dL/g, the slitting properties in a slitting step are lowered, and therefore, such is not preferable.

The "intrinsic viscosity" as referred to in the invention means an intrinsic viscosity of, for example, the whole of a polyester molecule constituting the support and means a value as obtained by plotting a concentration when the support (exclusive of insoluble solids such as a powder) is dissolved in a phenol/1,1,2,2-tetrachloroethane mixed solvent (a weight ratio: 60/40) at 25° C. on the abscissa and a relative viscosity corresponding to a solution thereof as measured by an Ubbelohde's viscometer on the ordinate, respectively and extrapolating a zero point of the concentration.

Furthermore, it is preferable that the support in the invention has a Young's modulus in the machine direction of from 7.0 GPa to 8.6 GPa and a Young's modulus in the transverse direction of from 5.4 GPa to 8.0 GPa. When the Young's modulus in the machine direction is less than 7.0 GPa, the strength is insufficient and touch with a head is poor, and therefore, such is not preferable. In contrast, when it exceeds 8.6 GPa, in forming into a digital magnetic tape, a sound as generated when a rotatory head of a digital video recorder hits the tape is resonant, and therefor, such is not preferable. Furthermore, when the Young's modulus in the transverse direction is less than 5.4 GPa, the strength of the magnetic tape in the transverse direction is insufficient so that the tape is likely folded by a guide pin for controlling tape path during running of the tape, and therefore, such is not preferable. In contrast, when it exceeds 8.0 GPa, the dimensional stability is deteriorated, and therefore, such is not preferable.

Furthermore, the support in the invention preferably has a surface roughness SRa (A) of the surface (surface A) in the side at which the magnetic layer is provided, as measured using a tracer type three-dimensional surface roughness meter, of from 1.0 to 6.0 nm, and more preferably from 1.5 to 5.5 nm. When the surface roughness SRa (A) is less than 1.0 nm, when formed into a magnetic tape, the running durability is insufficient, while when it exceeds 6 nm, when formed into a magnetic tape, the output is insufficient, and therefore, such is not preferable.

The support in the invention preferably has a surface roughness SRa (B) of the back surface (surface B) of the support in the invention against the magnetic layer side, as measured using a tracer type three-dimensional surface roughness meter, of from 6.0 to 10.0 nm, and more preferably from 6.5 to 9.0 nm. When the surface roughness SRa (B) is less than 6.0 nm, a coefficient of friction increases so that handling of the film becomes worse, while when it exceeds 10.0 nm, in winding up the film in a roll form, offset or shape transfer of the roughness of the surface B onto the surface A side occurs, thereby making the surface A side rough, and therefore, such is not preferable.

Incidentally, the foregoing Young's modulus is a value as measured at a specimen length of 100 mm and a width of ½ inches under a circumstance at 25° C. and 50% RH by using a tensile tester of STROGRAPH V1-C Model, manufactured by Toyo Seiki Seisaku-sho, Ltd. according to the method as defined in JIS K7113 (1995). Furthermore, the surface roughness SRa is a value as measured by WYKO's HD-2000.

It is preferable that the support in the invention contains a fine particle having a mean particle size of from 10 nm to 2.0 μm, and preferably from 30 nm to 1.0 μm in an amount of not more than 3.0% by weight, and preferably from 0.01% by weight to 2.0% by weight. As this fine particle, silica, calcium carbonate, alumina, polyacrylate particles, polystyrene particles, and silicone resins can be preferably used.

Moreover, what the back surface (surface B) of the support in the invention against the side at which the magnetic layer is coated is rougher than the magnetic layer side (surface A) is preferable in view of the film formation step of a support, the production step of a magnetic recording medium, and the running properties of a tape.

Though a method for roughing the surface B is not particularly limited, a method in which two kinds of polyester film layers which are different in the kind, mean particle size and/or content of the fine particle from each other are laminated is preferable. As the method for laminating the polyester film layers, a co-extrusion method is preferably employed. During this, it is preferable that the thickness of the polyester film layer which forms the surface B is from ½ to ¹⁄₁₀ of the thickness of the entire film. Examples of the fine particle to be used in the polyester film layer which forms the surface B include calcium carbonate, silica, alumina, polystyrene particles, and silicone rein particles. The mean particle size is preferably from 80 nm to 2.0 μm, and more preferably from 100 nm to 1.6 μm; and the addition amount is preferably from 0.001 to 3.0% by weight, and more preferably from 0.01 to 2.0% by weight. Incidentally, a polyester film layer which forms the surface A is preferably a layer containing not more than 1.0% by weight of the foregoing fine particle having a mean particle size of from 10 nm to 1.0 μm, and preferably from 30 to 80 nm.

The support in the invention, for example, the polyester film, can be produced according to a conventionally known method. For example, by using a known extruder, a polyester which forms the surface A and a polyester which forms the surface B are laminated within a die and extruded in a sheet-like form at a temperature of the melting point (Tm) to (Tm+70)° C. from a nozzle, followed by quenching for solidification at from 40 to 90° C. to obtain a laminated unstretched film. Thereafter, the unstretched film is stretched in a uniaxial direction at a ratio of from 2.5 to 4.5 times, and preferably from 2.8 to 3.9 times at a temperature of from approximately [glass transition temperature (Tg)–10° C.] to (Tg+70)° C. and then stretched in a perpendicular direction to the foregoing direction with a ratio of from 4.5 to 8.0 times, and preferably from 4.5 to 6.0 times at a temperature of from approximately Tg to (Tg+70)° C., and further again stretched in a longitudinal direction and/or crosswise direction, if desired, thereby obtaining a biaxially oriented film. That is, two-stage, three-stage, four-stage or multi-stage stretching may be carried out. The entire stretch ratio is usually 12 times or more, preferably from 12 to 32 times, and more preferably from 14 to 26 times in terms of an area stretch ratio. When the biaxially oriented film is subsequently further subjected to thermal fixation and crystallization at a temperature of from (Tg+70)° C. to (Tm–10)° C., for example, from 180 to 250° C., excellent stability is imparted. Incidentally, the thermal fixation time is preferably from 10 to 60 seconds. It is preferable that the biaxially oriented film is relaxed in a proportion of not more than 3.0%, and preferably from 0.5 to 2.0% in the longitudinal direction and/or crosswise direction by this thermal fixation treatment, thereby adjusting a degree of thermal shrinkage.

[First and Second Radiation Curable Resin Layers]

In the magnetic recording medium of the invention, a first radiation curable resin layer is provided on one surface (surface A) of the non-magnetic support, and a second radiation curable resin layer is provided on the other surface (surface B) thereof. Each of the first and second radiation curable resin layers will be hereinafter sometimes referred to simply as "smoothed layer".

By providing the smoothed layer on the both surfaces of the non-magnetic support, it is possible to suppress influences against the magnetic layer due to not only the roughness of the surface of the non-magnetic support but also projections of the surface of the back layer.

The smoothed layer in the invention can be formed by coating a coating solution containing a binder and a radiation curable compound as described below on the non-magnetic support, drying and then curing with radiations.

<Binder>

Examples of the binder which is used in the smoothed layer in the invention include conventionally known organic solvent-soluble thermoplastic resins, thermosetting resins, reactive resins, and mixtures thereof. Specific examples thereof include polyamide resins, polyamideimide resins, polyester resins, polyurethane resins, vinyl chloride based resins, and acrylic resins. Furthermore, there may be the case where in coating a non-magnetic layer and/or a magnetic layer after forming the smoothed layer, the smoothed layer is swollen with or dissolved in a solvent contained in the non-magnetic layer and magnetic layer so that surface properties are lowered. In such case, a binder which is not dissolved in the solvent contained in the non-magnetic layer and magnetic layer but is soluble in other organic solvents is preferable.

A glass transition temperature of the binder is preferably from 0 to 120° C., and more preferably from 10 to 80° C. When the glass transition temperature of the binder is 0° C. or higher, blocking does not occur at the end surface. Furthermore, when it is not higher than 120° C., not only an internal stress within the smoothed layer can be relieved, but also an adhesive strength is excellent. Furthermore, with respect to the molecular weight of the binder, ones having a weight average molecular weight in the range of from 1,000 to 100,000 can be used. Binders having a weight average molecular weight in the range of from 5,000 to 50,000 are especially preferable. When the weight average molecular weight of the binder is 1,000 or more, blocking does not occur at the end surface, and when it is not more than 100,000, solubility in an organic solvent is good so that the smoothed layer can be sufficiently coated.

<Radiation Curable Compound>

The "radiation curable compound" which is contained in the coating solution for smoothed layer in the invention refers to a compound having such properties that when irradiated with ultraviolet rays or radiations such as electron beams, it initiates polymerization or crosslinking, whereby it is polymerized and cured. In the radiation curable compound, reaction does not proceed unless energy (ultraviolet rays or radiations) is given from the outside. For that reason, in the coating solution containing the radiation curable compound, its viscosity is stable unless irradiated with ultraviolet rays or radiations, and high coating film smoothness can be obtained. Furthermore, since the reaction proceeds in an instant by high energy by ultraviolet rays or radiations, the coating solution containing the radiation curable compound can give rise to high coating film strength.

Incidentally, the radiations which are employed in the invention include a variety of radiations such as X-rays, α-rays, β-rays, and γ-rays.

A molecular weight of the radiation curable compound which is used in the invention is preferably in the range of from 200 to 2,000. When the molecular weight falls within the foregoing range, a coating solution is flowable so that a smooth coating film can be realized.

Specific examples of the radiation curable compound include (meth)acrylic esters, (meth)acrylamides, (meth) acrylic acid amides, allyl compounds, vinyl ethers, and vinyl esters. Incidentally, the term "(meth)acryl" as referred to herein means a general term of "acryl" and "methacryl".

Specific examples of bifunctional radiation curable compounds include ethylene glycol di(meth)acrylate, propylene glycol di(meth)acrylate, butanediol di(meth)acrylate, hexanediol di(meth)acrylate, diethylene glycol di(meth)acrylate, triethylene glycol di(meth)acrylate, tetraethylene glycol di(meth)acrylate, neopentyl glycol di(meth)acrylate, tripropylene glycol di(meth)acrylate, polyether (meth)acrylate, polyether (meth)acrylate, polyester (meth)acrylate, polyester (meth)acrylate, polyurethane (meth)acrylate, polyurethane (meth)acrylate, bisphenol A, bisphenol F, hydrogenated bisphenol A, hydrogenated bisphenol F, compounds resulting from addition of (meth)acrylic acid to such an alkylene oxide adduct, isocyanuric acid alkylene oxide-modified di(meth) acrylates, and compounds having a cyclic structure such as tricyclodecanedimethanol di(meth)acrylate.

Specific examples of trifunctional radiation curable compounds include trimethylolpropane tri(meth)acrylate, trimethylolethane tri(meth)acrylate, alkylene oxide-modified tri (meth)acrylates of trimethylolpropane, pentaerythritol tri (meth)acrylate, dipentaerythritol tri(meth)acrylate, isocyanuric acid alkylene oxide-modified tri(meth)acrylates, propionic acid dipentaerythritol tri(meth)acrylate, and hydroxypivalaldehyde-modified dimethylolpropane tri (meth)acrylate.

Specific examples of tetrafunctional or polyfunctional radiation curable compounds include pentaerythritol tetra (meth)acrylate, ditrimethylolpropane tetra(meth)acrylate, dipentaerythritol penta(meth)acrylate, propionic acid dipentaerythritol tetra(meth)acrylate, dipentaerythritol hexa(meth) acrylate, and alkylene oxide-modified hexa(meth)acrylates of phosphazene.

Of the foregoing specific examples of the radiation curable compound, bifunctional (meth)acrylate compounds having a molecular weight of from 200 to 2,000 are preferable; and alicyclic compounds such as dimethyloltricyclodecane, hydrogenated bisphenol A, and hydrogenated bisphenol F, bisphenol A, bisphenol F, and compounds resulting from addition of (meth)acrylic acid to such an alkylene oxide adduct are more preferable.

The radiation curable compound which is used in the smoothed layer of the magnetic recording medium of the invention may be used in combination with the foregoing binder.

In the case where ultraviolet rays are used for polymerizing the foregoing radiation curable compound, it is preferred to use a polymerization initiator in combination. As the polymerization initiator, a photo radical polymerization initiator, a photo cationic polymerization initiator, a photo amine generator, or the like can be used.

Specific examples of the photo radical polymerization initiator include α-diketones (for example, benzil and diacetyl); acyloins (for example, benzoin); acyloin ethers (for example, benzoin methyl ether, benzoin ethyl ether, and benzoin isopropyl ether); thioxanthones (for example, thioxanthone, 2,4-diethylthioxanthone, and thioxanthone-4-sulfonic acid); benzophenones (for example, benzophenone, 4,4'-bis (dimethylamino)benzophenone, and 4,4'-bis(diethylamino) benzophenone); Michler's ketones; acetophenones (for example, acetophenone, 2-(4-toluenesulfonyloxy)-2-phenylacetophenone, p-dimethylaminoacetophenone, α,α'-dimethoxyacetoxybenzophenone, 2,2'-dimethoxy-2-phenylacetophenone, p-methoxyacetophenone, 2-methyl-[4-(methylthio)phenyl]-2-morpholino-1-propanone, and 2-benzyl-2-dimethylamino-1-(4-morpholinophenyl)-butan-1-one); quinones (for example, anthraquinone and 1,4-naphthoquinone); halogen compounds (for example, phenacyl chloride, trihalomethylphenylsulfones, and tris (trihalomethyl)-s-triazines); acylphosphine oxides; and peroxides (for example, di-t-butylperoxide).

Furthermore, specific examples of the photo radical polymerization initiator include commercially available products such as IRGACURE 184, IRGACURE 261, IRGACURE 369, IRGACURE 500, IRGACURE 651, and IRGACURE 907 (all of which are manufactured by Ciba-Geigy AG); DAROCUR 1173, DAROCUR 1116, DAROCUR 2959, DAROCUR 1664, and DAROCUR 4043 (all of which are manufactured by Merck Ltd., Japan); KAYACURE DETX, KAYACURE MBP, KAYACURE DMBI, KAYACURE EPA, and KAYACURE OA (all of which are manufactured by Nippon Kayaku Co., Ltd.); VICURE 10 and VICURE 55 (all of which are manufactured by Stauffer Co., Ltd.); TRIGONAL P1 (manufactured by Akzo Co., Ltd.); SANDORAY 1000 (manufactured by Sandoz co., Ltd.); DEAP (manufactured by Apjohn Co., Ltd.); and QUANTACURE PDO, QUANTACURE ITX, and QUANTACURE EPD (all of which are manufactured by Ward Blekinsop Co., Ltd.).

Examples of the photo cationic polymerization initiator include diazonium salts, triphenylsulfonium salts, metallocene compounds, diaryl iodonium salts, nitrobenzyl sulfonates, α-sulfonyloxyketones, diphenyldisulfones, and imidyl sulfonates.

Specific examples of the photo cationic polymerization initiator include commercially available products such as ADEKA ULTRASET PP-33, OPTMER SP-150, and OPTMER SP-170 (all of which are manufactured by Asahi Denka Co., Ltd.) (diazonium salts); OPTOMER SP-150 AND OPTOMER SP-170 (all of which are manufactured by Asahi Denka Co., Ltd.) (sulfonium salts); and IRGACURE 261 (manufactured by Ciba-Geigy AG) (metallocene compounds).

Examples of the photo amine generator include nitrobenzyl carbamates and iminosulfonates. These photopolymerization initiators are properly selected and used depending upon the exposure condition (for example, under an oxygen atmosphere or an oxygen-free atmosphere). These photopolymerization initiators can also be used in combination of two or more kinds thereof.

In the case where electron beams are used for the purpose of polymerizing the foregoing radiation curable compound, van de Graaff type scanning system, a double scanning system, or a curtain beam system can be employed as an accelerator of electron beams. Of these, a curtain beam system from which a large output is relatively cheaply obtained is preferable. With respect to electron beam characteristics, an acceleration voltage is from 10 to 1,000 kV, and preferably from 50 to 300 kV. The acceleration voltage of 10 kV or more is sufficient as a transmitting amount of energy. Furthermore, when the acceleration voltage is not more than 1,000 kV, an energy efficiency to be used for the polymerization is not lowered. An absorbed dose is from 0.5 to 20 Mrad, and preferably from 1 to 10 Mrad. When the absorbed dose is 0.5 Mrad or more, sufficient strength is obtained due to curing reaction. Furthermore, when it is not more than 20 Mrad, since an energy efficiency to be used for curing is not lowered and a body to be irradiated does not cause the generation of heat, it is possible to prevent deformation of the non-magnetic support from occurring.

On the other hand, in the case of where ultraviolet rays are used for the purpose of polymerizing the foregoing radiation curable compound, its amount is preferably from 10 to 100 mJ/cm$^2$. When the amount is 10 mJ/cm$^2$ or more, sufficient strength is obtained due to curing reaction. When it is not more than 100 mJ/cm$^2$, since an energy efficiency to be used for curing is not lowered and the generation of heat of a body to be irradiated can be prevented, the non-magnetic support does not cause deformation. With respect to irradiation unit and irradiation condition of ultraviolet rays (UV) and electron beams (EB), those which are known as described in *UV•EB Koka Gijutsu* (UV and EB Curing Technologies) (published by Sangyo Tosho Publishing) and *Tei Enerugi Denshisen Shosha no Oyo Gijutsu* (Applied Technologies of Irradiation with Low-Energy Electron Beams) (2000) (published by CMC Publishing Co., Ltd.) can be employed.

The binder and the radiation curable compound which are used for forming the smoothed layer of the invention can be used singly or in combination thereof. With respect to the addition amounts of the binder and the radiation curable compound, the amount of the radiation curable compound is from 105 to 2,000 parts by weight, preferably from 110 to 1,000 parts by weight, and more preferably from 120 to 800 parts by weight based on 100 parts by weight of the binder. When the mixing amount of the radiation curable compound against the binder falls within the foregoing range, not only leveling properties which are advantageous for smoothing can be secured, but also curing shrinkage due to crosslinking is suppressed, and therefore, such is preferable.

Besides, the smoothed layer of the invention can further contain a conductive powder or an ionic surfactant for the purposes of preventing beforehand the generation of static electricity and making the magnetic recording medium free from electro static charge. Examples of the conductive powder include conductive metals, metal compounds, and carbon blacks. Specific examples thereof include metal powders (for example, gold, silver, platinum, palladium, and nickel); metal compounds (for example, potassium titanate, tin oxide, antimony-containing tin oxide, zinc oxide, antimony oxide, tin-containing iridium oxide, $TiB_2$, $ZrB_2$, TiC, and TiN); and carbon blacks (for example, furnace black, acetylene black, channel black, and Ketjen Black). These conductive powders can be used singly or in combination of two or more kinds thereof. Furthermore, as the ionic surfactant, examples of low-molecular weight type ionic surfactants include ionic surfactants of an anionic surfactant type (for example, long-chain alkyl compounds having a sulfonic acid salt group, a sulfuric acid salt group, a phosphoric acid salt group, etc.) and a cationic surfactant type having a quaternary nitrogen compound. Moreover, examples of high-molecular weight type ionic surfactant include polymers having an ionized nitrogen atom in the principal chain thereof and sulfonic acid salt-modified polystyrenes.

A composition containing the radiation curable compound, the binder, and the photopolymerization initiator, and the conductive powder or the ionic surfactant to be optionally added, which is used for forming the smoothed layer of the invention, is formed into a coating solution by using a solvent capable of solving these components therein. The solvent is not particularly limited, and conventionally known organic solvents can be used. Drying of the smoothed layer of the invention may be any of spontaneous drying or drying by heating. The smoothed layer can be formed by coating the foregoing coating solution on the non-magnetic support, drying, and then curing upon irradiation of the coated layer with the foregoing radiations.

<Thickness of Smoothed Layer>

A thickness of the smoothed layer in the invention is, for example, in the range of from 0.3 to 3.0 μm, preferably from 0.35 to 2.0 μm, and more preferably from 0.4 to 1.5 μm. Though the thickness of the smoothed layer varies depending upon the constituent components and the like, so far as surface properties and physical strength of the smoothed coated layer are secured, a thin thickness is preferable for realizing a high capacity.

The smoothed layer of the magnetic recording medium of the invention contains a filler. By containing a filler in the smoothed layer, rigidity can be imparted to the medium, and durability can be enhanced.

It is suitable that the filler to be contained in the smoothed layer in the invention has a thickness of from 0.5 to 5 nm. When the thickness of the filler is less than 0.5 nm, the strength is insufficient, while when it exceeds 5 nm, the surface of the smoothed layer becomes rough, and therefore, such is not preferable. The thickness of the filler is preferably from 0.7 to 4 nm, and more preferably from 0.8 to 2 nm.

Furthermore, it is suitable that an aspect ratio between the thickness of the filler and the mean particle size of the filler is from 50 to 10,000.

The term "aspect ratio" as referred to in this specification means a ratio of the means particle size of the filler to the thickness of the filler (mean particle size/thickness).

When the foregoing aspect ratio is less than 50, the dynamic strength is insufficient, while when it exceeds 10,000, the surface of the smoothed layer becomes rough, and therefore, such is not preferable. The foregoing aspect ratio is preferably from 60 to 5,000, and more preferably from 70 to 1,000.

From the viewpoints of obtaining an effect as a tabular particle and obtaining a smoothed layer having excellent surface smoothness, the mean particle size is preferably in the range of from 25 to 10,000 nm.

The kind of the filler in the invention is not particularly limited so far as the foregoing thickness and aspect ratio are met. Specifically, clay compounds, swellable minerals, and the like which meet the foregoing thickness and aspect ratio can be used as they are or after they have been coated with an organic compound. In particular, fillers obtained by making an organic onium ion act on a clay compound, a swellable mineral, etc. are preferable. The structure of a clay compound, a swellable mineral, etc. coated with an organic compound is quite different from the coagulation structure of a μm size before the treatment with an organic compound, in which multiple layers which the clay compound or swellable mineral or the like has are laminated. That is, by introducing an organic onium ion having compatibility with a resin between the layers, a gap between the layers is enlarged, the clay compound or swellable mineral or the like coated with an organic compound is dispersed very finely in an independently flaky state in the resin.

The foregoing clay compound or swellable mineral or the like is composed of a tetrahedral sheet mainly made of silicon oxide and an octahedral sheet mainly made of a metal hydroxide, and examples thereof include smectite clay, swellable mica, and swellable vermiculite.

The foregoing smectite clay is represented by the following formula and is naturally or synthetically available.

Formula $$X_{0.2-0.6}Y_{2-3}Z_4O_{10}(OH)_2 \cdot nH_2O$$

In the foregoing formula, X represents at least one member selected from the group consisting of K, Na, ½ Ca, and ½ Mg; Y represents at least one member selected from the group consisting of Mg, Fe, Mn, Ni, Zn, Li, Al, and Cr; and Z represents at least one member selected from Si and Al. Incidentally, $H_2O$ represents a water molecule bound with an interlaminar ion, and n markedly fluctuates according to the interlaminar ion and relative humidity.

Specific examples of the foregoing smectite clay include montmorillonite, beidellite, nontronite, saponite, iron saponite, hectorite, sauconite, stevensite, and bentonite, substitution products and derivatives thereof, and mixtures thereof.

Furthermore, the swellable mica is represented by the following formula and is naturally or synthetically available.

Formula $$X_{0.5-1.0}Y_{2-3}(Z_4O_{10})(F, OH)_2$$

In the foregoing formula, X represents at least one member selected from the group consisting of Li, Na, K, Rb, Ca, Ba, and Sr; Y represents at least one member selected from the group consisting of Mg, Fe, Ni, Mn, Al, and Li; and Z represents at least one member selected from the group consisting of Si, Ge, Al, Fe, and B.

Such swellable mica has such properties that it is swollen in water, a polar solvent which is compatible with water in an arbitrary proportion, and a mixed solvent of water and the subject polar solvent. Examples thereof include Li type taeniolite, Na type taeniolite, Li type tetrasilicon mica, and Na type tetrasilicon mica, substitution products and derivatives thereof, and mixtures thereof.

Moreover, the swellable vermiculite includes a trioctahedral type and a dioctahedral type and is represented by the following formula.

Formula $$(Mg, Fe, A)_{2-3}(Si_{4-x}Al_x)O_{10}(OH)_2 \cdot (M^+, M^{2+}_{1/2})_x \cdot nH_2O$$

In the foregoing formula, M represents an exchangeable cation of an alkali or alkaline earth metal; x is from 0.6 to 0.9; and n is from 3.5 to 5.

The foregoing stratiform silicate compound is used singly or in combination of two or more kinds thereof. The crystal structure of the stratiform silicate compound is preferably a structure with a high purity wherein layers are stratified regularly in the c-axis direction. However, a so-called mixed stratiform mineral wherein the crystal cycle is disturbed to allow a plurality of types of crystal structures to be mixed may also be used.

The organic onium ion which is used in the smoothed layer of the invention has a structure represented by an ammonium ion, a phosphonium ion, a sulfonium ion, and an onium ion derived from a heteroaromatic ring. When the organic onium ion is present, it is possible to introduce an organic structure having a low intermolecular force between the layers of the foregoing negatively charged stratiform silicate compound, thereby increasing compatibility between the stratiform silicate compound and the resin.

Examples of the organic onium ion include alkylamine ions (for example, a laurylamine ion and a myristylamine ion) and ammonium ions having a combination of an alkyl group and a glycol chain (for example, a diethylmethyl(polypropylene oxide)ammonium ion and a dimethylbis(polyethylene glycol)ammonium ion).

Such an organic compound-coated clay compound can be produced by a known technology for reacting an organic onium ion with a stratiform clay mineral having a negative layer lattice and containing an exchangeable cation.

The thickness and aspect ratio of the filler falling within the range of the invention can be obtained by dispersing a particle by a dispersing machine to which a high shear force is applied, such as a homomixer, in coating the filler such as a clay compound by using an organic compound such as an organic onium salt.

The filler in the invention is preferably contained in the smoothed layer in an amount of from 0.1 to 30% by weight and more preferably blended in an amount of from 0.5 to 25% by weight, and further preferably from 1 to 20% by weight.

The magnetic recording medium of the invention is preferably a magnetic recording medium comprising a non-magnetic support having provided on one surface thereof a first radiation curable resin layer, a non-magnetic layer, and a magnetic layer in this order and having provided on the other layer thereof a second radiation curable resin layer and a back layer in this order. The layer construction, production process and physical characteristics of these layers will be described below.

[Magnetic Layer]

<Ferromagnetic Powder>

As the ferromagnetic powder to be contained in the magnetic layer in the invention, any of a ferromagnetic metal powder and a ferromagnetic hexagonal ferrite powder can be used.

(Ferromagnetic Metal Powder)

While the ferromagnetic metal powder which is used in the magnetic layer in the invention is not particularly limited so far as it contains Fe as the major component (inclusive of alloys), it is preferably a ferromagnetic alloy powder containing α-Fe as the major component. Besides the prescribed atoms, this ferromagnetic metal powder may contain atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. Besides the foregoing α-Fe, one containing at least one member selected from the group consisting of Al, Si, Ca, Y, Ba, La, Nd, Co, Ni, and B is preferable, and one containing Co, Al, and Y is especially preferable. More specifically, it is preferable that Co, Al, and Y are contained in an amount of from 10 to 40 atomic %, from 2 to 20 atomic %, and from 1 to 15 atomic %, respectively based on Fe.

Such a ferromagnetic powder may be previously treated with a dispersant, a lubricant, a surfactant, an antistatic agent, etc. as described later prior to dispersing. Moreover, the ferromagnetic metal powder may contain a small amount of water, a hydroxide or an oxide. The water content of the ferromagnetic powder is preferably from 0.01 to 2%. It is preferable that the water content of the ferromagnetic powder is optimized depending upon the kind of the binder. A crystallite size is preferably from 8 to 20 nm, more preferably from 10 to 18 nm, and especially preferably from 12 to 16 nm. This crystallite size is an average value as determined from a half-value width of a diffraction peak by the Scherrer's method under a condition of a radiation source of CuKαI, a tube voltage of 50 kV and a tube current of 300 mA by using an X-ray analyzer (RINT2000 SERIES, manufactured by Rigaku Corporation). An average long axis length of the ferromagnetic metal powder is from 20 to 100 nm, preferably from 30 to 90 nm, and especially preferably from 40 to 80 nm. When the average long axis length is 20 nm or more, it is possible to effectively suppress a reduction of magnetic characteristics due to thermal fluctuation. Furthermore, when the average long axis length is not more than 100 nm, it is possible to obtain good S/N while keeping a low noise. The average long axis length can be determined by a combination of a method by capturing a transmission electron microscopic photograph and reading a short axis length and a long axis length of the ferromagnetic powder directly from the photograph and a method for tracing the transmission electron microscopic photograph by an image analyzer IBASSI manufactured by Carl Zeiss and reading it.

The ferromagnetic powder which is used in the magnetic layer in the invention preferably has a specific surface area ($S_{BET}$), as measured by the BET method, of 30 m$^2$/g or more and less than 50 m$^2$/g, and more preferably from 38 to 48 m$^2$/g. In this way, good surface properties and a low noise are compatible with each other. It is preferred to optimize the pH of the ferromagnetic metal powder by a combination with a binder to be used. The pH is preferably in the range of from 4 to 12, and more preferably from 7 to 10. If desired, the ferromagnetic powder may be subjected to a surface treatment with Al, Si, P, or an oxide thereof. Its amount is from 0.1 to 10% based on the ferromagnetic powder. When the surface treatment is applied, adsorption of a lubricant such as fatty acids becomes not more than 100 mg/m$^2$, and therefore, such is preferable.

In some case, the foregoing ferromagnetic metal powder contains soluble inorganic ions of Na, Ca, Fe, Ni, Sr, etc. If the content of the soluble inorganic ions is not more than 200 ppm, the characteristics are scarcely affected especially. Furthermore, it is preferable that the ferromagnetic metal powder which is used in the magnetic layer in the invention contains a less volume of cavities. The value thereof is preferably not more than 20% by volume, and more preferably not more than 5% by volume. Furthermore, with respect of the shape of the ferromagnetic metal powder, any of an acicular shape, a granulate shape, a rice grain-like shape, or a tabular shape may be employed so far as the characteristics with respect to the particle size as described previously are met. It is especially preferred to use an acicular ferromagnetic powder. In the case of an acicular ferromagnetic metal powder, an acicular ratio is preferably from 4 to 12, and more preferably from 5 to 12.

A coercive force (Hc) of the ferromagnetic metal powder is preferably from 159.2 to 238.8 kA/m, and more preferably from 167.2 to 230.8 kA/m. A saturation magnetic flux density is preferably from 150 to 300 T·m, and more preferably from 160 to 290 T·m. A saturation magnetization (σs) is preferably from 140 to 170 A·m$^2$/kg, and more preferably from 145 to 160 A m$^2$/kg.

It is preferable that an SFD (switching field distribution) of the magnetic material per se is small, and the SFD is preferably not more than 0.8. When the SFD is not more than 0.8, electromagnetic conversion characteristics are good, and an output is high. Also, reversal of magnetization is sharp, and a peak shift becomes small. Accordingly, such is suitable for high-density digital magnetic recording. For the sake of making the Hc distribution small, in the ferromagnetic metal powder, there are a method for making the particle size distribution of goethite good, a method for using monodispersed α-Fe$_2$O$_3$, and a method for preventing sintering among particles.

As the ferromagnetic metal powder, ones which are obtained by known production processes can be used, and the following methods can be enumerated. That is, examples thereof include a method for reducing sintering prevention-treated hydrated iron oxide or iron oxide with a reducing gas such as hydrogen to obtain an Fe or Fe—Co particle; a method for reduction with a composite organic acid salt (mainly an oxalic acid salt) and a reducing gas such as hydrogen; a method for thermal decomposition of a metal carbonyl compound; a method for adding a reducing agent such as sodium borohydride, a phosphorous acid salt, and hydrazine in an aqueous solution of a ferromagnetic metal to achieve reduction; and a method for evaporation of a metal in a low-pressure inert gas to obtain a fine powder. The thus obtained ferromagnetic metal powder is subjected to a known slow oxidization treatment. A method for reducing hydrated iron oxide or iron oxide with a reducing gas such as hydrogen and controlling partial pressures of an oxygen-containing gas and an inert gas, the temperature and the time, thereby forming an oxidized film on the surface is preferable because the amount of demagnetization is low.

(Ferromagnetic Hexagonal Ferrite Powder)

Examples of the ferromagnetic hexagonal ferrite ferromagnetic powder which is contained in the magnetic layer of the invention include barium ferrite, strontium ferrite, lead ferrite, calcium ferrite, and substituted bodies thereof with Co, etc. More specific examples thereof include magnetoplumbite type barium ferrite and strontium ferrite, magnetoplumbite type ferrite in which the particle surface is coated with spinel, and magnetoplumbite type barium ferrite and strontium ferrite partially containing a spinel phase. Besides, in addition to the prescribed atoms, the ferromagnetic hexagonal ferrite ferromagnetic powder may contain atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. In general, materials having elements (for example, Co—Zn, Co—Ti, Co—Ti—Zr, Co—Ti—Zn, Ni—Ti—Zn, Nb—Zn—Co, Sb—Zn—Co, and Nb—Zn) added thereto can be used. Also, there are some materials containing inherent impurities depending upon the raw material and production process.

A mean particle size of the ferromagnetic hexagonal ferrite ferromagnetic powder is in the range of from 5 to 40 nm, preferably from 10 to 38 nm, and more preferably from 15 to 36 nm. In order to increase a tack density, in the case of regenerating a magneto-resistance head (MR head), a low noise is required, and a tabular size is preferably not more than 40 nm. Furthermore, when an average tabular size is not more than 5 nm, stable magnetization is expected without being influenced by thermal fluctuation.

A tabular ratio (tabular size/tabular thickness) of the ferromagnetic hexagonal ferrite ferromagnetic powder is preferably from 1 to 15, and more preferably from 1 to 7. When the tabular ratio is low, packing properties in the magnetic layer become high. On the other hand, when the tabular ratio is too low, sufficient alignment properties are not obtained. Accordingly, it is preferable that the tabular ratio is 1 or more. Furthermore, when the tabular ratio is not more than 15, a noise due to stacking among particles can be suppressed. Furthermore, in this particle size range, the specific surface area as measured by the BET method is from 10 to 200 m$^2$/g. This substantially agrees with a calculated value from the tabular size and tabular thickness of the particle. In general, it is preferable that the distribution of the particle tabular size/tabular thickness of the ferromagnetic hexagonal ferrite ferromagnetic powder is as narrow as possible. Though the distribution of the particle tabular size/tabular thickness is hardly digitized, it can be compared by randomly measuring 500 particles from a particle TEM photograph. While the distribution of the particle tabular size/tabular thickness is often not a normal distribution, when measured and expressed in terms of a standard deviation against the mean size, [σ/(mean size)] is from 0.1 to 2.0. In order to make the particle size distribution sharp, not only the particle forming reaction system is made uniform as far as possible, but also the formed particles are subjected to a distribution improving treatment. For example, there are known a method for selectively dissolving an ultra-fine particle in an acid solution and other methods.

The coercive force (Hc) of the ferromagnetic hexagonal ferrite particle can be prepared to an extent of from about 39.8 to 398 kA/m (from 500 to 5,000 Oe). The higher the coercive force (Hc), the more advantageous for high-density recording is. The coercive force (Hc) is controlled by an ability of the recording head. In the invention, the coercive force (Hc) is from about 159.2 to 238.8 kA/m, and preferably from 175.1 kA/m to 222.9 kA/m. In the case where the saturation magnetization of the head exceeds 1.4 teslas, the coercive force (Hc) is preferably 159.2 kA/m or more. The coercive force (Hc) can be controlled by the particle size (tabular size and tabular thickness), the kind and amount of the element to be contained, the substitution site of the element, the particle forming reaction condition, etc. The saturation magnetization (σs) is from 40 to 80 A·m$^2$/kg (emu/g). Though it is preferable that the saturation magnetization (σs) is high, when the particle becomes fine, the saturation magnetization (σs) is liable to become small. For the purpose of improving the saturation magnetization (σs), known methods such as complexing of spinel ferrite with magnetoplumbite ferrite and selection of the kind and addition amount of the element to be contained can be employed. It is also possible to use W type hexagonal ferrite.

There is also employed a method in which in dispersing the ferromagnetic hexagonal ferrite powder, the surface of the magnetic material particle is treated with a substance adaptive with the dispersion medium and the polymer. As the surface treating agent, inorganic compounds and organic compounds are used. With respect to major compounds, compounds of Si, Al, P, etc., a variety of silane coupling agents, and a variety of titanium coupling agents are representative. The addition amount is from 0.1 to 10% by weight based on the magnetic material. The pH of the magnetic material is important for dispersion, too. In general, the pH is from about 4 to 12. Though there is an optimum value depending upon the dispersion medium and the polymer, the pH is chosen to be from about 6 to 11 in view of chemical stability and preservability of the medium. The content of water to be contained in the magnetic material influences the dispersion. Though there is an optimum value depending upon the dispersion medium and the polymer, the content of water is usually chosen to be from 0.01 to 2.0%.

Examples of the production process of a ferromagnetic hexagonal ferrite powder include (1) a glass crystallization method in which barium oxide, iron oxide and a metal oxide for substituting iron are mixed with a glass forming substance such as boron oxide so as to have a desired ferrite composition, the mixture is melted and then quenched to form an amorphous body, and then, the amorphous body is again heated, rinsed and pulverized to obtain a barium ferrite crystal powder; (2) a hydrothermal reaction method in which a barium ferrite composition metal salt solution is neutralized with an alkali, and after eliminating by-products, the liquid phase is heated at 100° C. or higher, followed by rinsing, drying and pulverization to obtain a barium ferrite crystal powder; and (3) a coprecipitation method in which a barium ferrite composition metal salt solution is neutralized with an alkali, and after eliminating by-products, the residue is dried and treated at not higher than 1,100° C., followed by pulverization to obtain a barium ferrite crystal powder. However, the production process of a ferromagnetic hexagonal ferrite powder according to the invention is not limited to these methods, and any of these methods can be employed. The ferromagnetic hexagonal ferrite powder may be subjected to a surface treatment with Al, Si, P, or an oxide thereof as the need arises. Its amount is from 0.1 to 10% by weight based on the ferromagnetic powder; and when subjected to a surface treatment, adsorption of a lubricant such as fatty acids becomes not more than 100 mg/m$^2$, and therefore, such is preferable. In some case, the ferromagnetic powder contains soluble inorganic ions of Na, Ca, Fe, Ni, Sr, etc. While it is substantially preferable that the ferromagnetic powder does not contain such soluble inorganic ions, if the content of the soluble inorganic ions is not more than 200 ppm, the characteristics are scarcely affected especially.

<Binder>

Examples of the binder which can be used in the magnetic layer of the invention include conventionally known thermoplastic resins (for example, polyurethane resins and polymers or copolymers containing, as a constituent unit, vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, and vinyl ether); thermosetting resin (for example, phenol resins, epoxy resins, polyurethane curable resins, urea resins, melamine resins, alkyd resins, acrylic reactive resins, formaldehyde resins, silicone resins, epoxypolyamide resins, mixtures of a polyester resin and an isocyanate prepolymer, mixtures of a polyester polyol and a polyisocyanate, and mixtures of a polyurethane and a polyisocyanate); reactive resins; and mixtures thereof.

Of these, polyurethane resins are preferable; and polyurethane resins obtained by reacting a polyol having a cyclic structure (for example, hydrogenated bisphenol A and a polypropylene oxide adduct of hydrogenated bisphenol A) and an alkylene oxide chain and having a molecular weight of from 500 to 5,000, a polyol having a cyclic structure and having a molecular weight of from 200 to 500 as a chain extender, and an organic diisocyanate and having a hydrophilic polar group; polyurethane resins obtained by reacting a polyester polyol composed of an aliphatic dibasic acid (for example, succinic acid, adipic acid, and sebacic acid) and an aliphatic diol having an alkyl branched side chain and not having a cyclic structure (for example, 2,2-dimethyl-1,3-propanediol, 2-ethyl-2-butyl-1,3-propanediol, and 2,2-diethyl-1, 3-propanediol), an aliphatic diol having 3 or more carbon atoms and a branched alkyl side chain (for example, 2-ethyl-2-butyl-1,3-propanediol and 2,2-diethyl-1,3-propanediol) as a chain extender, and an organic diisocyanate and having a hydrophilic polar group; and polyurethane resins obtained by reacting a polyol compound having a cyclic structure and a long chain alkyl chain (for example, a dimer diol) and an organic diisocyanate and having a hydrophilic polar group are more preferable.

An average molecular weight of the polar group-containing polyurethane based resin which is used in the invention is preferably from 5,000 to 100,000, and more preferably from 10,000 to 50,000. When the average molecular weight is 5,000 or more, a defect that the physical strength is reduced, for example, the resulting magnetic coating film becomes brittle, is not brought so that durability of the magnetic recording medium can be kept. Furthermore, when the average molecular weight is not more than 100,000, solubility in a solvent and dispersibility can be kept. Moreover, when the average molecular weight falls within the foregoing range, a proper viscosity of the coating material is obtained, workability is good, and handling is easy.

Examples of the polar group which is contained in the foregoing polyurethane based resin include —COOM, —$SO_3$M, —$OSO_3$M, —P=O(OM)$_2$, —O—P=(OM)$_2$ (wherein M represents a hydrogen atom or an alkali metal base), —OH, —NR$_2$, —N$^+$R$_3$ (wherein R represents a hydrocarbon group), an epoxy group, —SH, and —CN. Ones in which at least one of these polar groups is introduced by copolymerization or addition reaction can be used. Furthermore, in the case where the polar group-containing polyurethane based resin has an OH group, what the polyurethane based resin has a branched OH group is preferable in view of curing properties and durability. It is preferable that from 2 to 40 branched OH groups per molecule are present; and it is more preferable that from 3 to 20 branched OH groups per molecule are present. Furthermore, an amount of the polar group is from $10^{-1}$ to $10^{-8}$ moles/g, and preferably from $10^{-2}$ to $10^{-6}$ moles/g.

Specific examples of the binder include VAGH, VYHH, VMCH, VAGF, VAGD, VROH, VYES, VYNC, VMCC, XYHL, XYSG, PKHH, PKHJ, PKHC, and PKFE (all of which are manufactured by Union Carbide Corporation); MPR-TA, MPR-TA5, MPR-TAL, MPR-TSN, MPR-TMF, MPR-TS, MPR-TM, and MPR-TAO (all of which are manufactured by Nissin Chemical Industry Co., Ltd.); 1000W, DX80, DX81, DX82, DX83, and 100FD (all of which are manufactured by Denki Kagaku Kogyo K.K.); MR-104, MR-105, MR110, MR100, MR555, and 400X-110A (all of which are manufactured by Zeon Corporation); NIPPOLAN N2301, N2302 and N2304 (all of which are manufactured by Nippon Polyurethane Industry Co., Ltd.); PANDEX T-5105, T-R3080 and T-5201, BURNOCK D-400 and D-210-80, and CRISVON 6109 and 7209 (all of which are manufactured by Dainippon Ink and Chemicals, Incorporated); VYLON UR8200, UR8300, UR-8700, RV530 and RV280 (all of which are manufactured by Toyobo Co., Ltd.); DAIFERAMINE 4020, 5020, 5100, 5300, 9020, 9022 and 7020 (all of which are manufactured by Dainichiseika Color & Chemicals Mfg. Co., Ltd.); MX 5004 (manufactured by Mitsubishi Chemical Corporation); SANPRENE SP-150 (manufactured by Sanyo Chemical Industries, Ltd.); and SARAN F310 and F210 (all of which are manufactured by Asahi Kasei Corporation).

An addition amount of the binder which is used in the magnetic layer of the invention is in the range of from 5 to 50% by weight, and preferably from 10 to 30% by weight based on the weight of the hexagonal ferrite ferromagnetic powder. Furthermore, it is in the range of from 5 to 50% by weight, and preferably from 10 to 30% by weight based on the weight of the ferromagnetic metal powder. Moreover, in the case where a polyurethane resin is used, the polyurethane resin is used in an amount of from 2 to 20% by weight, and it is preferred to use a combination with a polyisocyanate in an amount in the range of from 2 to 20% by weight. However, for example, in the case where head corrosion occurs due to a very small amount of eliminated chlorine, it is possible to use only the polyurethane or only the polyurethane and the polyisocyanate. In the case where a vinyl chloride based resin is used as other binder, its addition amount is preferably in the range of from 5 to 30% by weight. In the invention, in the case of using a polyurethane, its glass transition temperature is from –50 to 150° C., and preferably from 0 to 100° C.; its breaking extension is from 100 to 2,000%; its breaking stress is usually from 0.49 to 98 MPa (from 0.05 to 10 kg/mm$^2$); and its breakdown point is preferably from about 0.49 to 98 MPa (from 0.05 to 10 kg/mm$^2$).

As a matter of course, the addition amount of the binder which is used in the invention, the amount of the vinyl chloride based resin, the polyurethane resin, the polyisocyanate or other resins occupied in the binder, the molecular weight of each of the resins for forming the magnetic layer, the amount of the polar group, the physical characteristics of the resins to be contained, and the like can be varied between the magnetic layer and a non-magnetic layer as described later, if desired. Rather, they must be optimized for the respective layers, and known technologies regarding multilayered magnetic layers can be applied. For example, in the case where the amount of the binder is changed in the respective layers, it is effective to increase the amount of the binder in the magnetic layer for the sake of reducing scratches on the surface of the magnetic layer. For the sake of making head touch against the head satisfactory, it is possible to impart flexibility by increasing the amount of the binder in the non-magnetic layer.

Examples of the polyisocyanate which can be used in the invention include isocyanates (for example, tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate); products between such an isocyanate and a polyalcohol; and polyisocyanates formed by condensation of such an isocyanate. Among these isocyanates, examples of trade names of commercially available products include CORONATE L, CORONATE-HL, CORONATE 2030, CORONATE 2031, MILLIONATE MR, and MILLIONATE MTL (all of which are manufactured by Nippon Polyurethane Industry Co., Ltd.); TAKENATE D-102, TAKENATE D-110N, TAKENATE D-200, and TAKENATE D-202 (all of which are manufactured by Takeda Pharmaceutical Company Limited); and DESMODUR L, DESMODUR IL, DESMODUR N, and DSEMODUR HL (all of which are manufactured by Sumika Bayer Urethane Co., Ltd.). These can be used singly or in combination of two or more kinds thereof while utilizing a difference in the curing reactivity in each layer.

If desired, additives can be added in the magnetic layer in the invention. As the additives, there can be enumerated an abrasive, a lubricant, a dispersant, a dispersing agent, a fungicide, an antistatic agent, an antioxidant, a solvent, and carbon black.

Examples of these additives include molybdenum disulfide, tungsten disulfide, graphite, boron nitride, graphite fluoride, silicone oils, polar group-containing silicones, fatty acid-modified silicones, fluorine-containing silicones, fluorine-containing alcohols, fluorine-containing esters, polyolefins, polyglycols, polyphenyl ethers, aromatic ring-containing organic phosphonic acids (for example, phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid) and alkali metal salts thereof, alkylphosphonic acids (for example, octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, and isoeicosylphosphonic acid) and alkali metal salts thereof, aromatic phosphoric esters (for example, phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate) and alkali metal salts thereof, alkyl phosphates (for example, octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, and isoeicosyl phosphate) and alkali metal salts thereof, alkyl sulfonates and alkali metal salts thereof, fluorine-containing alkyl sulfates and alkali metal salts thereof, monobasic fatty acids having from 10 to 24 carbon atoms, which may contain an unsaturated bond and which may be branched (for example, lauric acid, myristic acid, palmitic acid, stearic acid, behenic acid, butyl stearate, oleic acid, lonoleic acid, linolenic acid, elaidic acid, and erucic acid) and metal salts thereof, mono-fatty acid esters, di-fatty acid esters or polyhydric fatty acid esters composed of a monobasic fatty acid having from 10 to 24 carbon atoms, which may have an unsaturated bond and which may be branched, any one of a monohydric to hexahydric alcohol having from 2 to 22 carbon atoms, which may have an unsaturated bond and which may be branched, an alkoxy alcohol having from 12 to 22 carbon atoms, which may have an unsaturated bond and which may be branched, and a monoalkyl ether of an alkylene oxide polymer (for example, butyl stearate, octyl stearate, amyl stearate, isooctyl stearate, octyl myristate, butyl laurate, butoxyethyl stearate, anhydrosorbitan monostearate, and anhydrosorbitan tristearate), fatty acid amides having from 2 to 22 carbon atoms, and aliphatic amines having from 8 to 22 carbon atoms. Also, besides the foregoing hydrocarbon groups, those having an alkyl group, an aryl group, or an aralkyl group substituted with other group than a nitro group and hydrocarbon groups such as halogen-containing hydrocarbons (for example, F, Cl, Br, $CF_3$, $CCl_3$, and $CBr_3$) can be enumerated.

Nonionic surfactants such alkylene oxide based surfactants, glycerin based surfactants, glycidol based surfactants, and alkylphenol ethylene oxide adducts; cationic surfactants such as cyclic amines, ester amides, quaternary ammonium salts, hydantoin derivatives, heterocyclic compounds, phosphonium compounds, and sulfonium compounds; anionic surfactants containing an acid group such as a carboxyl group, a sulfonic group, and a sulfuric acid ester group; and ampholytic surfactants such as amino acids, amino sulfonic acids, sulfuric or phosphoric esters of an amino alcohol, and alkyl betaine types can also be used. These surfactants are described in detail in *Kaimen Kasseizai Binran* (Surfactant Handbook) (published by Sangyo Tosho Publishing).

The foregoing dispersant and lubricant and the like need not always be completely pure and may contain, in addition to the major components, impurities such as isomers, unreacted materials, by-products, decomposition products, and oxides. The content of these impurities is preferably not more than 30% by weight, and more preferably not more than 10% by weight.

Specific examples of these additives include NAA-102, hardened castor oil fatty acid, NAA-42, CATION SA, NYMEEN L-201, NONION E-208, ANON BF, and ANON LG (all of which manufactured by NOF Corporation); FAL-205 and FAL-123 (all of which are manufactured by Takemoto Oil & Fat Company); ENUJELV OL (manufactured by New Japan Chemical Co., Ltd.); TA-3 (manufactured by Shin-Etsu Chemical Co., Ltd.); ARMIDE P (manufactured by Lion Akzo Co., Ltd.); DUOMIN TDO (manufactured by Lion Corporation); BA-41G (manufactured by The Nisshin Oil Mills, Ltd.); and PROFAN 2012E, NEWPOL PE61, and IONET MS-400(all of which are manufactured by Sanyo Chemical Industries, Ltd.).

As an organic solvent which is used in the magnetic layer of the invention, known organic solvents can be used. As the organic solvent, a ketone (for example, acetone, methyl ethyl ketone, methyl isobutyl ketone, diisobutyl ketone, cyclohexanone, isophorone, and tetrahydrofuran), an alcohol (for example, methanol, ethanol, propanol, butanol, isobutyl alcohol, isopropyl alcohol, and methylcyclohexanol), an ester (for example, methyl acetate, butyl acetate, isobutyl acetate, isopropyl acetate, ethyl lactate, and glycol acetate), a glycol ether (for example, glycol dimethyl ether, glycol monoethyl ether, and dioxane), an aromatic hydrocarbon (for example, benzene, toluene, xylene, cresol, and chlorobenzene), a chlorohydrocarbon (for example, methylene chloride, ethylene chloride, carbon tetrachloride, chloroform, ethylene chlorohydrin, and dichlorobenzene), N,N-dimethylformamide, hexane, or the like can be used at any ratio.

These organic solvents need not always be 100% pure and may contain, in addition to the major components, impurities such as isomers, unreacted materials, by-products, decomposition products, oxides, and moisture. The content of these impurities is preferably not more than 30% by weight, and more preferably not more than 10% by weight. The organic solvent which is used in the invention is preferably the same type for both the magnetic layer and the non-magnetic layer. However, the addition amount of the organic solvent may be varied. It is important that a solvent having a high surface tension (for example, cyclohexanone and dioxane) is used in the non-magnetic layer, thereby enhancing the coating stability, specifically, an arithmetic mean value of the solvent composition of the upper layer is not lower than an arithmetic mean value of the solvent composition of the non-magnetic layer. In order to enhance the dispersibility, it is preferable that the polarity is strong to some extent; and it is preferable that the solvent composition contains 50% or more of a solvent having a dielectric constant of 15 or more. Also, it is preferable that the solubility parameter is from 8 to 11.

The type and the amount of the dispersant, lubricant and surfactant which are used in the magnetic layer of the invention can be changed in the magnetic layer and the non-magnetic layer as described later as the need arises. For example, as a matter of course, although not limited only to the examples as described herein, the dispersant has properties of adsorbing or bonding via a polar group, and it is assumed that the dispersant adsorbs or bonds mainly to the surface of the ferromagnetic powder in the magnetic layer and adsorbs or bonds, via the polar group, mainly to the surface of the non-magnetic powder in the non-magnetic layer as described later and that an organophosphorus compound having been once adsorbed is hardly desorbed from the surface of a metal or metal compound, etc. Accordingly, since in the invention, the surface of the ferromagnetic powder or the surface of the non-magnetic powder as described later is in a state that it is covered by an alkyl group, an aromatic group, etc., the compatibility of the ferromagnetic powder or the non-magnetic powder with the binder resin component is enhanced, and further, the dispersion stability of the ferromagnetic powder or the non-magnetic powder is also improved. With respect to the lubricant, since it is present in a free state, its exudation to the surface is controlled by using fatty acids having a different melting point in the non-magnetic layer and the magnetic layer or by using esters having a different boiling point or polarity. The coating stability can be improved by regulating the amount of the surfactant, and the lubricating effect can be enhanced by increasing the amount of the lubricant to be added in the non-magnetic layer. Also, all or a part of the additives which are used in the invention may be added in any stage at the time of preparing a coating solution for magnetic layer or non-magnetic layer. For example, they may be mixed with a ferromagnetic powder prior to the kneading step; they may be added in the kneading step by the ferromagnetic powder, the binder and the solvent; they may be added during the dispersing step; they may be added after the dispersing step; or they may be added immediately before coating.

Furthermore, carbon black can be added in the magnetic layer in the invention as the need arises. In the case where carbon black is added in the magnetic recording medium of the invention, since a conductive polymer of a π-electron conjugated system is contained in the magnetic layer, the amount of carbon black can be made smaller than that in conventional magnetic recording media. Examples of the carbon black which can be used in the magnetic layer of the invention include furnace black for rubber, thermal black for rubber, carbon black for coloring, and acetylene black. The carbon black preferably has a specific surface area of from 5 to 500 $m^2/g$, a DBP oil absorption of from 10 to 400 mL/100 g, a particle size of from 5 to 300 mμ, a pH of from 2 to 10, a water content of from 0.1 to 10%, and a tap density of from 0.1 to 1 g/mL.

Specific examples of the carbon black which is used in the invention include BLACKPEARLS 2000, 1300, 1000, 900, 905, 800 and 700 and VULCAN XC-72 (all of which are manufactured by Cabot Corporation); #80, #60, #55, #50, and #35 (all of which are manufactured by Asahi Carbon Co., Ltd.); #2400B, #2300, #900, #1000, #30, #40, and #10B (all of which are manufactured by Mitsubishi Chemical Corporation); CONDUCTEX SC, RAVEN 150, 50, 40 and 15, and RAVEN-MT-P (all of which are manufactured by Columbian Carbon Co.); and Ketjen Black EC (manufactured by Nippon EC K.K.). The carbon black may be subjected to a surface treatment with a dispersant, etc. or grafting with a resin, or a part of the surface of the carbon black may be subjected to graphitization. Also, the carbon black may be dispersed with a binder in advance prior to addition to a magnetic coating material. The carbon black can be used singly or in combination. In the case where the carbon black is used, it is preferred to use the carbon black in an amount of from 0.1 to 30% by weight based on the weight of the magnetic material. The carbon black has functions of preventing static charging of the magnetic layer, reducing a coefficient of friction, imparting light-shielding properties, and enhancing a film strength.

Such functions vary depending upon the type of carbon black to be used. Accordingly, with respect to the carbon black which is used in the invention, it is, as a matter of course, possible to change and choose the type, the amount and the combination in the magnetic layer and the non-magnetic layer according to the intended purpose based on the previously mentioned various characteristics such as particle size, oil absorption, electric conductivity, and pH, and rather, they should be optimized for the respective layers.

The carbon black which can be used in the magnetic layer of the invention can be referred to, for example, *Kabon Burakku Binran* (Carbon Black Handbook) (edited by The Carbon Black Association of Japan).

It is desired that the magnetic layer in the invention preferably has a central surface average surface roughness (SRa) of from 1 to 4 nm, and more preferably from 1.5 to 2.5 nm. When the central surface average surface roughness of the magnetic layer is from 1 to 4 nm, there gives rise to an effect for obtaining excellent electromagnetic conversion character.

[Non-magnetic Layer]

Next, the detail contents regarding the non-magnetic layer will be described below.

The magnetic recording medium of the invention may have a non-magnetic layer containing a binder and a non-magnetic powder on the non-magnetic support. The non-magnetic powder which can be used in the non-magnetic layer may be an inorganic substance or an organic substance. Carbon black or the like can also be used. Examples of the inorganic substance include metals, metal oxides, metal carbonates, metal sulfates, metal nitrides, metal carbides, and metal sulfides.

Specific examples thereof include titanium oxides (for example, titanium dioxide), cerium oxide, tin oxide, tungsten oxide, ZnO, $ZrO_2$, $SiO_2$, $Cr_2O_3$, α-alumina having an α-component proportion of from 90 to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. They are used singly or in combination of two or more kinds thereof. Of these, α-iron oxide and titanium oxide are preferable.

The form of the non-magnetic powder may be any one of acicular, spherical, polyhedral, or tabular. A crystallite size of the non-magnetic powder is preferably from 4 nm to 1 μm, and more preferably from 40 to 100 nm. What the crystallite size falls within the range of from 4 nm to 1 μm is preferable because not only the dispersion does not become difficult, but also a suitable surface roughness is obtained. While a mean particle size of such a non-magnetic powder is preferably from 5 nm to 2 μm, it is possible to bring the same effect by combining non-magnetic powders having a different mean particle size, if desired or widening the particle size distribution of even a single non-magnetic powder. The mean particle size of the non-magnetic powder is especially preferably from 10 to 200 nm. What the mean particle size of the non-magnetic powder falls within the range of from 5 nm to 2 μm is preferable because not only dispersion is satisfactory, but also a suitable surface roughness is obtained.

A specific surface area of the non-magnetic powder is from 1 to 100 $m^2/g$, preferably from 5 to 70 $m^2/g$, and more preferably from 10 to 65 $m^2/g$. What the specific surface area falls within the range of from 1 to 100 $m^2/g$ is preferable because not only a suitable surface roughness is obtained, but also dispersion can be carried out with a desired amount of the binder. An oil absorption using dibutyl phthalate (DBP) is from 5 to 100 mL/100 g, preferably from 10 to 80 mL/100 g, and more preferably from 20 to 60 mL/100 g. A specific gravity is from 1 to 12, and preferably from 3 to 6. A tap density is from 0.05 to 2 g/mL, and preferably from 0.2 to 1.5 g/mL. When the tap density is in the range of from 0.05 to 2 g/mL, there is little scattering of particles, the operation is easy, and the non-magnetic power tends to hardly stick to a device. Though a pH of the non-magnetic powder is preferably from 2 to 11, the pH is especially preferably from 6 to 9. When the pH is in the range of from 2 to 11, a coefficient of friction does not become large at a high temperature and a high humidity or by liberation of a fatty acid. A water content of the non-magnetic powder is from 0.1 to 5% by weight, preferably from 0.2 to 3% by weight, and more preferably from 0.3 to 1.5% by weight. What the water content falls within the range of from 0.1 to 5% by weight is preferable because not only dispersion is satisfactory, but also the viscosity of the coating material after dispersion becomes stable. An ignition loss is preferably not more than 20% by weight, and a small ignition loss is preferable.

Furthermore, in the case where the non-magnetic powder is an inorganic powder, its Mohs hardness is preferably from 4 to 10. When the Mohs hardness is in the range of from 4 to 10, it is possible to secure durability. The non-magnetic powder preferably has an absorption of stearic acid of from 1 to 20 µmoles/m², and more preferably from 2 to 15 µmoles/m². It is preferable that the non-magnetic powder has heat of wetting in water at 25° C. in the range of from 200 to 600 erg/cm². Also, it is possible to use a solvent whose heat of wetting falls within this range. The number of water molecules on the surface at from 100 to 400° C. is suitably from 1 to 10 per 100 angstrom. The pH at an isolectric point in water is preferably from 3 to 9. It is preferable that $Al_2O_3$, $SiO_2$, $TiO_2$, $ZrO_2$, $SnO_2$, $Sb_2O_3$, or $ZnO$ is present on the surface of the non-magnetic-powder through a surface treatment. In particular, $Al_2O_3$, $SiO_2$, $TiO_2$, and $ZrO_2$ are preferable for the dispersibility, with $Al_2O_3$, $SiO_2$ and $ZrO_2$ being more preferable. They may be used in combination or can be used singly. Furthermore, depending upon the intended purpose, a surface-treated layer resulting from coprecipitation may be used. There may be employed a method in which the surface is first treated with alumina and the surface layer is then treated with silica, or vice versa. Moreover, though the surface-treated layer may be made of a porous layer depending upon the intended purpose, it is generally preferable that the surface-treated layer is uniform and dense.

Specific examples of the non-magnetic powder which is used in the non-magnetic layer of the invention include NONATITE (manufactured by Showa Denko K.K.); HIT-100 and ZA-G1 (all of which are manufactured by Sumitomo Chemical Co., Ltd.); DPN-250, DPN-250BX, DPN-245, DPN-270BX, DPB-550BX, and DPN-550RX (all of which are manufactured by Toda Kogyo Corp.); titanium oxides TTO-51B, TTO-55A, TTO-55B, TTO-55C, TTO-55S, TTO-55D, SN-100 and MJ-7 and α-iron oxides E270, E271 and E300 (all of which are manufactured by Ishihara Sangyo Kaisha, Ltd.); STT-4D, STT-30D, STT-30, and STT-65C (all of which are manufactured by Titan Kogyo Kabushiki Kaisha); MT-100S, MT-100T, MT-150W, MT-500B, T-600B, T-100F, and T-500HD (all of which are manufactured by Tayca Corporation); FINEX-25, BF-1, BF-10, BF-20, and ST-M (all of which are manufactured by Sakai Chemical Industry Co., Ltd.); DEFIC-Y and DEFIC-R (all of which are manufactured by Dowa Mining Co., Ltd.); AS2BM and TiO2P25 (all of which are manufactured by Nippon Aerosil Co., Ltd.); 100A and 500A (all of which are manufactured by Ube Industries, Ltd.); and Y-LOP (manufactured by Titan Kogyo Kabushiki Kaisha) and calcined products thereof. Of these, titanium dioxide and α-iron oxide are especially preferable as the non-magnetic powder.

By mixing carbon black with the non-magnetic powder, not only the surface electrical resistance of the non-magnetic layer can be reduced and light transmittance can be decreased, but also a desired micro-Vickers hardness can be obtained. In the magnetic recording medium of the invention, since a conductive polymer of a π-electron conjugated system can be contained in the non-magnetic layer, the amount of carbon black can be made smaller than that in conventional magnetic recording media. Though the micro-Vickers hardness of the non-magnetic layer is usually from 25 to 60 kg/mm², for the purpose of adjusting the head contact, it is preferably from 30 to 50 kg/mm². The micro-Vickers hardness can be measured by using a thin film hardness meter (HMA-400, manufactured by NEC Corporation) with, as an indenter tip, a triangular pyramidal diamond needle having a tip angle of 80° and a tip radius of 0.1 µm. The light transmittance is generally standardized such that absorption of infrared rays having a wavelength of approximately 900 nm is not more than 3% and for example, in the case of VHS magnetic tapes, is not more than 0.8%. For achieving this, furnace black for rubber, thermal black for rubber, carbon black for coloring, acetylene black, and the like can be used.

The carbon black which is used in the non-magnetic layer of the invention has a specific surface area of from 100 to 500 m²/g, and preferably from 150 to 400 m²/g and a DBP oil absorption of from 20 to 400 mL/100 g, and preferably from 30 to 200 mL/100 g. The carbon black has a particle size of from 5 to 80 nm, preferably from 10 to 50 nm, and more preferably from 10 to 40 nm. The carbon black preferably has a pH of from 2 to 10, a water content of from 0.1 to 10%, and a tap density of from 0.1 to 1 g/mL.

Specific examples of the carbon black which can be used in the non-magnetic layer of the invention include BLACK-PEARLS 2000, 1300, 1000, 900, 800, 880 and 700 and VULCAN XC-72 (all of which are manufactured by Cabot Corporation); #3050B, #3150B, #3250B, #3750B, #3950B, #950, #650B, #970B, #850B, and MA-600 (all of which are manufactured by Mitsubishi Chemical Corporation); CONDUCTEX SC and RAVEN 8800, 8000, 7000, 5750, 5250, 3500, 2100, 2000, 1800, 1500, 1255 and 1250 (all of which are manufactured by Columbian Carbon Co.); and Ketjen Black EC (manufactured by Akzo Nobel).

Furthermore, those processed by subjecting carbon black to a surface treatment with a dispersant, etc. or grafting with a resin, or by graphitizing a part of the surface thereof may be used. Also, prior to adding carbon black to a coating material, the carbon black may be previously dispersed with a binder. The carbon black can be used in an amount in the range not exceeding 50% by weight based on the foregoing inorganic powder and within the range not exceeding 40% by weight of the total weight of the non-magnetic layer. The carbon black can be used singly or in combination. The carbon black which can be used in the non-magnetic layer of the invention can be referred to, for example, *Kabon Burakku Binran* (Carbon Black Handbook) (edited by The Carbon Black Association of Japan).

Furthermore, it is possible to add an organic powder in the non-magnetic layer depending upon the intended purpose. Examples of such an organic powder include acrylic styrene based resin powders, benzoguanamine resin powders, melamine based resin powders, and phthalocyanine based pigments. Polyolefin based resin powders, polyester based resin powders, polyamide based resin powders, polyimide based resin powders, and polyfluoroethylene resins can also be used. As production processes thereof, those as described in JP-A-62-18564 and JP-A-60-255827 are employable.

With respect to the binder resin, lubricant, dispersant, additives, solvent, dispersion method and others of the non-magnetic layer, those in the magnetic layer can be applied. In particular, with respect to the amount and kind of the binder resin and the addition amount and kind of the additives and the dispersant, known technologies regarding the magnetic layer can be applied.

[Backcoat Layer and Easily Adhesive Layer]

In general, a magnetic tape for recording computer data is strongly required to have repeated running properties as compared with video tapes and audio tapes. For the sake of keeping such high running properties, it is possible to provide a back layer on the surface (surface B) of the non-magnetic support opposite to the surface on which the non-magnetic layer and the magnetic layer are provided.

In the coating material for back layer, an abrasive, an antistatic layer, and the like are dispersed in an organic along with a binder. A variety of inorganic pigments and carbon black can be used as particulate components. Furthermore, for example, nitrocellulose and resins such as phenoxy resins, vinyl chloride based resins, and polyurethanes can be used as the binder singly or in admixture.

The back layer in the invention preferably has a central surface average surface roughness (SRa) of from 2 to 5 nm, and more preferably from 3 to 4 nm. When the central surface average surface roughness (SRa) falls within the range of from 2 to 5 nm, the back layer is excellent in durability of the medium and winding up aptitude in the production step.

By providing a smoothed layer (second radiation curable resin layer) between the non-magnetic support and the back layer, not only it is possible to absorb and smooth irregular projections on the surface of the back layer, but also it is possible to reveal a cushioning effect, thereby securing smoothness of the magnetic layer.

In the non-magnetic support of the invention, an easily adhesive layer may be provided for the purpose of enhancing an adhesive strength to the smoothed layer. For the easily adhesive layer, for example, the following solvent-soluble substances can be used. That is, examples thereof include polyester resins, polyamide resins, polyamideimide resins, polyurethane resins, vinyl chloride based resins, vinylidene chloride resins, phenol resins, epoxy resins, urea resins, melamine resins, formaldehyde resins, silicone resins, starches, modified starch compounds, alginic acid compounds, casein, gelatin, pullulane, dextran, chitin, chitosan, rubber latexes, gum arabic, funori, natural gums, dextrin, modified cellulose resins, polyvinyl alcohol based resins, polyethylene oxide, polyacrylic acid based resins, polyvinylpyrrolidone, polyethyleneimine, polyvinyl ether, polymaleic acid copolymers, polyacrylamides, and alkyd resins. As the easily adhesive layer, one having a thickness of not more than 1 μm is used.

A glass transition temperature of the resin which is used in the foregoing easily adhesive layer is preferably from 30 to 120° C., and more preferably from 40 to 80° C. When the glass transition temperature of the resin is 30° C. or higher, blocking is not generated at the end surface. When it is not higher than 120° C., an internal stress in the easily adhesive layer can be relieved, and the adhesive layer is excellent in adhesive strength.

In the magnetic recording medium of the invention, the foregoing easily adhesive layer may be further provided between the smoothed layer and the magnetic layer and between the smoothed layer and the back layer, respectively.

[Layer Construction]

In the magnetic recording medium of the invention, the magnetic layer may be constructed of two or more layer as the need arises. Furthermore, the smoothed layer is provided on the both surfaces of the non-magnetic support, and the back layer is provided on the surface opposite to the side at which the magnetic layer is provided, if desired. In the magnetic recording medium of the invention, a variety of coating films such as a lubricant coating film and a coating film for protecting the magnetic layer may be further provided on the magnetic layer as the need arises. In addition, for the purpose of enhancing adhesion between the coating film and the non-magnetic support or other purpose, it is possible to provide an easily adhesive layer between the non-magnetic support and the non-magnetic layer.

In the magnetic recording medium of the invention, the magnetic layer or the non-magnetic layer and the magnetic layer can be provided on the both surfaces. In the case where the non-magnetic layer (lower layer) and the magnetic layer (upper layer) are provided, after coating the lower layer, the magnetic layer as the upper layer can be provided in the state that the lower layer is still wet or after drying. In view of production yield, simultaneous or sequential wet coating is preferable. However, in the case of a disk-like magnetic recording medium, coating after drying can also be satisfactorily employed. In the simultaneous or sequential wet coating in the multilayered construction of the invention, since the upper layer and the lower layer can be formed at the same time, a surface treatment step such as a calender step can be effectively applied, and the surface roughness of the magnetic layer as the upper layer can be improved even in an ultra-thin layer.

A preferred thickness of the non-magnetic support which is used in the invention is from 3 to 80 μm. For the non-magnetic support for computer tape, one having a thickness in the range of from 3.5 to 7.5 μm (preferably from 3 to 7 μm) is used. Furthermore, in the case where an easily adhesive layer is provided between the non-magnetic support and the non-magnetic layer or the magnetic layer, a thickness of the easily adhesive layer is from 0.01 to 0.8 μm, and preferably from 0.02 to 0.6 μm. Moreover, a thickness of the back layer to be provided on the surface of the non-magnetic support opposite to the side of the surface on which the non-magnetic layer and the magnetic layer are provided is form 0.1 to 1 μm, and preferably from 0.2 to 0.8 μm.

Though the thickness of the magnetic layer is optimized according to the saturation magnetization amount and the head gap length of the magnetic head to be used and a band of recording signals, it is generally from 10 to 100 nm, preferably from 20 to 80 nm, and more preferably from 30 to 80 nm. Also, a rate of fluctuation in thickness of the magnetic layer is preferably within ±50%, and more preferably within ±40%. The magnetic layer may be made of at least one layer. However, the magnetic layer may be separated into two or more layers having different magnetic characteristics, and a known configuration for multilayered magnetic layers can be applied.

A thickness of the non-magnetic layer of the invention is preferably from 0.02 to 3 μm, more preferably from 0.05 to 2.5 μm, and further preferably from 0.1 to 2 μm. Incidentally, the non-magnetic layer of the magnetic recording medium of the invention exhibits its effect so far as it is substantially non-magnetic. For example, even when it contains a small amount of magnetic substance as an impurity or intentionally, the effects of the invention can be revealed, and such construction can be considered to be substantially the same as that of the magnetic recording medium of the invention. Incidentally, the terms "substantially the same" mean that the non-magnetic layer has a residual magnetic flux density of not more than 10 T·m (100 G) or a coercive force of not more than 7.96 kA/m (100 Oe), and preferably has neither residual flux density nor coercive force.

[Production Process]

A process for producing a coating solution for magnetic layer of the magnetic recording medium which is used in the invention comprises at least a kneading step, a dispersing step, and optionally, a mixing step that is carried out before or after the preceding steps. Each of the steps may be separated into two or more stages. All of the raw materials which are used in the invention, including the hexagonal ferrite ferromagnetic powder or ferromagnetic metal powder, non-magnetic powder, benzenesulfonic acid derivative, conductive polymer of a π-electron conjugated system, binder, carbon black, abrasive, antistatic agent, lubricant and solvent, may be added in any step from the beginning or in the way of the step. Also, each of the raw materials may be divided and added across two or more steps. For example, a polyurethane may be divided and added in the kneading step, the dispersing step, and the mixing step for adjusting the viscosity after dispersion. In order to achieve the object of the invention, a conventionally known production technology can be employed as a part of the steps. In the kneading step, it is preferred to use a machine having a strong kneading power, such an open kneader, a continuous kneader, a pressure kneader, and an extruder. In the case where a kneader is used, the magnetic powder or non-magnetic powder and the whole or a part of the binder (however, preferably 30% or more of the whole of the binder) are kneaded in an amount in the range of from 15 to 500 parts by weight based on 100 parts by weight of the magnetic material. Details of these kneading treatments are described in JP-A-1-106338 and JP-A-1-79274. Also, for the sake of dispersing a solution for magnetic layer or a solution for non-magnetic layer, glass beads can be used. As such glass beads, dispersing media having a high specific gravity, such as zirconia beads, titania beads, and steel beads, are suitable. These dispersing media are used after optimizing the particle size and packing ratio. Known dispersion machines can be used.

According to the process for producing the magnetic recording medium of the invention, for example, a coating solution for magnetic layer is coated in a prescribed film thickness on the surface of the non-magnetic support having a smoothed layer on the both surfaces thereof. Here, plural coating solutions for magnetic layer may be subjected to multilayer coating sequentially or simultaneously, and a coating solution for magnetic layer as a lower layer and a coating solution for magnetic layer as an upper layer may be subjected to multilayer coating sequentially or simultaneously. As a coating machine for coating the foregoing coating solution for magnetic layer or coating layer for magnetic layer as a lower layer, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, and the like can be used. With respect to these, for example, *Saishin Kothingu Gijutsu* (Latest Coating Technologies) (May 31, 1983) (published by Sogo Gijutsu Center) can be referred to.

In the case of a magnetic tape, the coated layer of the coating solution for magnetic layer is subjected to a magnetic field alignment treatment of the ferromagnetic powder contained in the coated layer of the coating solution for magnetic layer in the longitudinal direction by using a cobalt magnet or a solenoid. In the case of a disk, although sufficient isotropic alignment properties can sometimes be obtained in a non-alignment state without using an alignment unit, it is preferred to use a known random alignment unit by, for example, obliquely and alternately arranging a cobalt magnet or applying an alternating magnetic field with a solenoid. The "isotropic alignment" as referred to herein means that, in the case of a ferromagnetic metal powder, in general, in-plane two-dimensional random alignment is preferable, but it can be three-dimensional random alignment by introducing a vertical component. In the case of a hexagonal ferrite, in general, it tends to be in-plane and vertical three-dimensional random alignment, but in-plane two-dimensional random alignment is also possible. By employing a known method using a heteropolar facing magnet so as to achieve vertical alignment, it is also possible to impart isotropic magnetic characteristics in the circumferential direction. In particular, in the case of carrying out high-density recording, vertical alignment is preferable. Furthermore, it is possible to carry out circumferential alignment by using a spin coater.

It is preferable that the drying position of the coating film can be controlled by controlling the temperature and blowing amount of dry air and the coating rate. The coating rate is preferably from 20 to 1,000 m/min; and the temperature of the dry air is preferably 60° C. or higher. It is also possible to carry out preliminary drying in a proper level prior to entering a magnet zone.

After drying, the coated layer is subjected to a surface smoothing treatment. For the surface smoothing treatment, for example, super calender rolls, etc, are employed. By carrying out the surface smoothing treatment, cavities as formed by the removal of the solvent at the time of drying disappear, whereby the packing ratio of the ferromagnetic powder in the magnetic layer is enhanced. Thus, a magnetic recording medium having high electromagnetic conversion characteristics is obtained.

As the rolls for calender treatment, rolls of a heat-resistant plastic such as epoxy, polyimide, polyamide, and polyamide-imide resins are used. It is also possible to carry out the treatment using metal rolls. It is preferable that the magnetic recording medium of the invention has a surface having extremely excellent smoothness such that a central surface average surface roughness is in the range of from 0.1 to 4.0 nm, and preferably from 0.5 to 3.0 nm in a cutoff value of 0.25 mm. As a method therefor, for example, a magnetic layer as formed by selecting a specific ferromagnetic powder and a binder as described above is subjected to the foregoing calender treatment. The calender rolls are preferably actuated under such conditions that the calender roll temperature is in the range of from 60 to 100° C., preferably from 70 to 100° C., and especially preferably from 80 to 100° C.; and that the pressure is in the range of from 100 to 500 kg/cm, preferably from 200 to 450 kg/cm, and especially preferably from 300 to 400 kg/cm.

Examples of means for reducing the degree of thermal shrinkage include a method for thermal treatment in a web form while handling at a low tension and a method for thermal treatment (thermo treatment) in a state that the tape is laminated, such as a bulk or cassette built-in state, and the both methods can be utilized. According to the former method, though the influence of projection transfer on the surface of the back layer is low, it is impossible to largely drop the degree of thermal shrinkage. On the other hand, according to the latter thermo treatment, though the degree of thermal shrinkage can be largely improved, the influence of projection transfer on the surface of the back layer is very large so that the magnetic layer causes rough surface, resulting in a reduction of the output and an increase of the noise. In particular, according to a magnetic recording medium accompanied with the thermo treatment, it is possible to supply a magnetic recording medium with a high output and a low noise. The resulting magnetic recording medium can be cut into a desired size by using a cutter, a punching machine, etc. and used.

[Physical Characteristics]

A saturation magnetic flux density of the magnetic layer of the magnetic recording medium which is used in the invention is from 10 to 300 T·m. Furthermore, a coercive force (Hr) of the magnetic layer is from 143.3 to 318.4 kA/m, and preferably from 159.2 to 278.6 kA/m. It is preferable that the distribution of coercive force is narrow. SFD and SFDr are preferably not more than 0.6, and more preferably not more than 0.2.

A coefficient of friction of the magnetic recording medium which is used in the invention against a head is not more than 0.5, and preferably not more than 0.3 at a temperature in the range of from −10 to 40° C. and at a humidity in the range of from 0 to 95%. A surface specific resistivity is preferably from $10^4$ to $10^{12}$ Ω/sq on the magnetic surface; and an electrostatic potential is preferably from −500 V to +500 V. The magnetic layer preferably has a modulus of elasticity at an elongation of 0.5% of from 0.98 to 19.6 GPa in each direction within the plane and preferably has a breaking strength of from 98 to 686 MPa; and the magnetic recording medium preferably has a modulus of elasticity of from 0.98 to 14.7 GPa in each direction within the plane, preferably has a residual elongation of not more than 0.5%, and preferably has a degree of thermal shrinkage at any temperature of not higher than 100° C. of not more than 1%, more preferably not more than 0.5%, and most preferably not more than 0.1%.

The magnetic layer preferably has a glass transition temperature (the maximum point of a loss elastic modulus in a dynamic viscoelasticity measurement as measured at 110 Hz) of from 50 to 180° C.; and the non-magnetic layer preferably has a glass transition temperature of from 0 to 180° C. The loss elastic modulus is preferably in the range of from $1 \times 10^7$ to $8 \times 10^8$ Pa; and a loss tangent is preferably not more than 0.2. When the loss tangent is too large, a sticking fault likely occurs. It is preferable that these thermal characteristics and mechanical characteristics are substantially identical within 10% in each direction in the plane of the medium.

The residual solvent to be contained in the magnetic layer is preferably not more than 100 mg/m², and more preferably not more than 10 mg/m². A porosity of the coated layer is preferably not more than 30% by volume, and more preferably not more than 20% by volume in both the non-magnetic layer and the magnetic layer. In order to achieve a high output, the porosity is preferably small, but there is some possibility that a certain value should be maintained depending upon the intended purpose. For example, in the case of a disk medium where repetitive use is considered to be important, a large porosity is often preferable in view of storage stability.

It is preferable that the magnetic layer has a maximum height ($SR_{max}$) of not more than 0.5 μm, a ten-point average roughness (SRz) of not more than 0.3 μm, a central surface peak height (SRp) of not more than 0.3 μm, a central surface valley depth (SRv) of not more than 0.3 μm, a central surface area factor (SSr) of from 20 to 80%, and an average wavelength (Sλa) of from 5 to 300 μm. The surface projections of the magnetic layer can be arbitrarily set up within the range of from 0 to 2,000 projections having a size of from 0.01 to 1 μm, and it is preferred to optimize the electromagnetic conversion characteristics and coefficient of friction by such properties. These properties can be easily controlled by controlling the surface properties by the smoothed layer, the particle size and amount of the powder to be added in the magnetic layer, the shape of the roll surface in the calender treatment, and so on. It is preferable that the curl is within ±3%.

Between the non-magnetic layer and the magnetic layer in the magnetic recording medium of the invention, it is easily assumed that these physical characteristics can be varied in the non-magnetic layer and the magnetic layer depending upon the intended purpose. For example, by increasing the modulus of elasticity of the magnetic layer, thereby enhancing the storage stability, it is possible to simultaneously make the modulus of elasticity of the non-magnetic layer lower than that of the magnetic layer, thereby improving the head contact of the magnetic recording medium.

Though the magnetic recording medium of the invention is not particularly limited with respect to the head which reproduces signals as magnetically recorded on the magnetic recording medium, it is preferably used for an MR head. In the case where an MR head is used for reproducing the magnetic recording medium of the invention, the MR head is not particularly limited. For example, a GMR head and a TMR head can be used. Furthermore, though the head which is used for magnetic recording is not particularly limited, its saturation magnetization amount is 1.0 T or more, and preferably 1.5 T or more.

EXAMPLES

The invention will be more specifically described below with reference to the following Examples. Incidentally, it should be construed that the components, the proportions, the operations, the orders, and the like as shown herein can be varied without departing from the spirit and scope of the invention and that the invention is never limited to the following Examples. Incidentally, in the Examples, all parts are a part by weight unless otherwise indicated.

Example 1

| Preparation of coating solution for magnetic layer | |
|---|---|
| Ferromagnetic metal powder: | 100 parts |
| Composition: Fe/Co/Al/Y = 67/20/8/5 | |
| Surface treating agent: $Al_2O_3$, $Y_2O_3$ | |
| Coercive force (Hc): 183 kA/m | |
| Crystallite size: 12.5 nm | |
| Long axis size: 45 nm | |
| Acicular ratio: 6 | |
| BET specific surface area ($S_{BET}$): 45 m²/g | |
| Saturation magnetization (σs): 115 A · m²/kg (115 emu/g) | |
| Polyurethane resin: | 12 parts |
| (Branched side chain-containing polyester polyol/diphenylmethane diisocyanate (MDI) based, containing a polar group: —$SO_3Na$ = 70 eq./ton) | |
| Phenylphosphonic acid: | 3 parts |
| α-$Al_2O_3$ (particle size: 0.06 μm): | 2 parts |
| Carbon black (mean particle size: 20 nm) : | 2 parts |
| Cyclohexanone: | 110 parts |
| Methyl ethyl ketone: | 100 parts |
| Toluene: | 100 parts |
| Butyl stearate: | 2 parts |
| Stearic acid: | 1 part |

-continued

| Preparation of coating solution for non-magnetic layer | |
|---|---|
| Non-magnetic powder:<br>α-Iron oxide<br>Surface treating agent: Al$_2$O$_3$, Y$_2$O$_3$<br>Long axis size: 0.15 nm<br>Tap density: 0.8 g/mL<br>Acicular ratio: 7<br>BET specific surface area (S$_{BET}$): 52 m$^2$/g<br>pH: 8<br>DBP oil absorption: 33 g/100 g | 85 parts |
| Carbon black:<br>DBP oil absorption: 120 mL/100 g<br>pH: 8<br>BET specific surface area (S$_{BET}$): 250 m$^2$/g<br>Volatile matter: 1.5% | 15 parts |
| Vinyl chloride copolymer:<br>Hydrophilic polar group: containing 1 × 10$^{-4}$ of —SO$_3$Na,<br>degree of polymerization: 300 | 12 parts |
| Polyester polyurethane resin:<br>Neopentyl glycol/caprolactone polyol/MDI = 0.9/2.6/1,<br>containing 1 × 10$^{-4}$ of —SO$_3$Na | 5 parts |
| Phenylphosphonic acid: | 3 parts |
| Cyclohexanone: | 140 parts |
| Methyl ethyl ketone: | 170 parts |
| Butyl stearate: | 2 parts |
| Stearic acid: | 1 part |

With respect to each of the coating solution for magnetic layer and the coating solution for non-magnetic layer, the foregoing respective components were kneaded for 60 minutes by using an open kneader and then dispersed for 120 minutes by using a sand mill. 6 parts of a trifunctional low-molecular weight polyisocyanate compound (CORONATE 3041, manufactured by Nippon Polyurethane Industry Co., Ltd.) was added to each of the resulting dispersions and additionally mixed with stirring for minutes, followed by filtration by a filter having a mean pore size of 1 µm to prepare a magnetic coating material and a non-magnetic coating material, respectively.

Preparation of Coating Solution of Smoothed Layer 20 parts of dipentaerythritol hexaacrylate (viscosity at 25° C.: 6,000 mPa·s), 40 parts of tripropylene glycol diacrylate (viscosity at 25° C.: 10 mPa·s), 40 parts of tricyclode-canedimethanol diacrylate (viscosity at 25° C.: 150 mPa·s), and 10 parts of the following filler were added to methyl ethyl ketone such that the amount of the foregoing acrylates became 30% by weight.

Filler of Smoothed Layer 4 g of montmorillonite (KUNIPIA F, manufactured by Kunimine Industries Co., Ltd.) was dispersed in 200 mL of water, to which was then added 2.5 g of n-dodecyl trimethy-lammonium chloride, and the mixture was dispersed for one hour by using a homomixer. The dispersion was subjected to suction filtration by using a membrane filter while thoroughly washing with water and then dried in vacuo at 100° C. for 24 hours, thereby obtaining an organic ammonium salt-coated montmorillonite. This filler had a thickness of 1.7 nm, an aspect ratio of 1,000, and a mean particle size of 0.1 µm.

Incidentally, with respect to the aspect ratio, a section of the smoothed layer was observed by using a transmission electron microscope (TEM H-800 MODEL, manufactured by Hitachi, Ltd.) with a magnification of from 20,000 to 30,000 times, the major axis and the thickness of at least 30 particles as seen in that section were measured, and a ratio of the major axis of the particle to the thickness was defined as an aspect ratio.

The foregoing coating solution for smoothed layer was coated on the both surfaces of a polyethylene terephthalate support having an intrinsic viscosity of 0.51 dL/g and composed of two layers of a surface (surface A) on which a magnetic layer was to be coated and a back surface (surface B) opposite to the surface on which a magnetic layer was to be coated, which had a central surface average surface roughness of 4 nm and 8 nm, respectively, by using a coil bar such that the thickness after drying was 0.5 µm. After drying, the coating film surfaces were irradiated and cured with electron beams having an acceleration voltage of 150 kV at an absorbed dose of 1 Mrad. The foregoing non-magnetic coating material and magnetic coating material were subjected to simultaneous double-layer coating on the side of the surface A of the formed smoothed layer in a thickness after drying of 80 nm, respectively by using a reversal roll. Thereafter, the following coating solution for back layer was coated on the side of the surface B of the smoothed layer in a thickness after drying of 0.4 µm.

A magnetic field alignment treatment was carried out in the state that the magnetic layer and the non-magnetic layer were still wet by using a magnet of 300 T·m (3,000 gausses). After drying, a surface smoothing treatment was further carried out by calendering at a rate of 100 m/min., a linear pressure of 300 kg/cm and a temperature of 90° C., followed by thermal treatment at 70° C. for 48 hours. The product was slit in a width of ½ inches to prepare a magnetic tape. The magnetic layer had an SRa of 2 nm, and the back layer had an SRa of 3 nm.

Preparation of Coating Solution for Back Layer

| Kneaded material 1 | |
|---|---|
| Carbon black A (particle size: 40 mµ): | 100 parts |
| Nitrocellulose RS1/2: | 50 parts |
| Polyurethane resin (glass transition<br>temperature: 50° C.): | 40 parts |
| Dispersant: | |
| Copper oleate: | 5 parts |
| Copper phthalocyanine: | 5 parts |
| Precipitated barium sulfate: | 5 parts |
| Methyl ethyl ketone: | 500 parts |
| Toluene: | 500 parts |
| Kneaded material 2 | |
| Carbon black B:<br>SSA: 8.5 m$^2$/g (mean particle seize: 270 mµ, DBP oil<br>absorption: 36 mL/100 g, pH: 10) | 100 parts |
| Nitrocellulose RS1/2: | 40 parts |
| Polyurethane resin: | 10 parts |
| Methyl ethyl ketone: | 300 parts |
| Toluene: | 300 parts |

The foregoing kneaded material 1 was preliminarily kneaded by using a roll mill, and the foregoing kneaded materials 1 and 2 were then dispersed by using a sand grinder. After completion, the following materials were added.

| Polyester resin: | 5 parts |
|---|---|
| Polyisocyanate: | 5 parts |

Example 2

A magnetic tape was prepared in the same preparation as in Example 1, except that in Example 1, the filler as used in the smoothed layer was changed to nontronite having a thickness of 2.0 nm, an aspect ratio of 50, and a mean particle size of 0.1 μm.

Example 3

A magnetic tape was prepared in the same preparation as in Example 1, except that the thickness of the smoothed layer to be coated on the side of the surface A of the non-magnetic support (first radiation curable resin layer) was changed to 0.5 μm and that the thickness of the smoothed layer to be coated on the surface B (second radiation curable resin layer) was changed to 0.2 μm.

Example 4

A magnetic tape was prepared in the same preparation as in Example 1, except that the intrinsic viscosity of the non-magnetic support was changed to 0.47 dL/g.

Comparative Example 1

A magnetic tape was prepared in the same preparation as in Example 1, except that each of the smoothed layers to be coated on the surface A side and surface B side was made of only a smoothed layer, to which the filler was not added.

Comparative Example 2

A magnetic tape was prepared in the same preparation as in Example 1, except that the filler was not added in the smoothed layer to be coated on the surface B side.

Comparative Example 3

A magnetic tape was prepared in the same preparation as in Example 1, except that the filler was not added in the smoothed layer to be coated on the surface A side.

Comparative Example 4

A magnetic tape was prepared in the same preparation as in Example 1, except that the intrinsic viscosity of the non-magnetic support was changed to 0.53 dL/g.

Comparative Example 4

A magnetic tape was prepared in the same preparation as in Example 1, except that the intrinsic viscosity of the non-magnetic support was changed to 0.45 dL/g.

(Evaluation)

The magnetic recording media as obtained in the foregoing Examples and Comparative Examples were evaluated with respect to output characteristics and durability. The respective evaluation methods are shown below.

(1) recording and reproducing (S/N ratio)

"Assembly of magnetic recording and reproducing system"
1) Thin-film magnetic head:
Structure of recording head: An inductive head in which a two-turn thin film coil is sandwiched by Co based amorphous magnetic thin film yokes.
Track width: 24 μm, gap length: 1.4 μm
Structure of reproducing head: A double shielded type shunt bias MR (magneto-resistance type) head. An MR element is made of an Fe/Ni (Permalloy) alloy thin film.
Track width: 10 μm, shield gap: 1.4 pm
2) Assembly of magnetic recording and reproducing system:
The recording and reproducing head was mounted in an F613A DRIVE, manufactured by Fujitsu Limited (3480 MODEL, ½ inches cartridge magnetic recording and reproducing unit) to prepare a magnetic recording and reproducing system with a tape speed of 100 inches/sec.
Servo control was carried out at 21° C. and 50% RH, and one track (width: 20 μm) was reproduced by a tape having a length of 90 m.

(2) Evaluation of durability of mag layer and back layer (scratch resistance)

By sliding the tape 1,000 times at a rate of 14 mm/sec under a circumstance at a temperature of 23° C. and a humidity of 70% while applying a load of 20 g onto an SUS rod of SUS420J, the surfaces of the Mag layer and back layer were observed.

The results are shown in Table 1.

TABLE 1

|  | Surface roughness (SRa) | Intrinsic viscosity of support (dL/g) | Output | Durability |
|---|---|---|---|---|
| Example 1 | Magnetic layer surface: 2 nm<br>Back layer surface: 3 nm | 0.51 | 105% | Mag/BB: No scratch was generated. |
| Example 2 | Magnetic layer surface: 2 nm<br>Back layer surface: 3.5 nm | 0.51 | 104% | Mag/BB: No scratch was generated. |
| Example 3 | Magnetic layer surface: 1.5 nm<br>Back layer surface: 3.5 nm | 0.51 | 103% | Mag/BB: No scratch was generated. |
| Example 4 | Magnetic layer surface: 2 nm<br>Back layer surface: 3 nm | 0.47 | 102% | Mag/BB: No scratch was generated. |
| Comparative Example 1 | Magnetic layer surface: 4.5 nm<br>Back layer surface: 6 nm | 0.51 | 95% | Mag/BB: Scratch was generated. |
| Comparative Example 2 | Magnetic layer surface: 2 nm<br>Back layer surface: 6 nm | 0.51 | 95% | BB: Scratch was generated. |
| Comparative Example 3 | Magnetic layer surface: 5 nm<br>Back layer surface: 4 nm | 0.51 | 95% | Mag: Scratch was generated. |

TABLE 1-continued

|  | Surface roughness (SRa) | Intrinsic viscosity of support (dL/g) | Output | Durability |
|---|---|---|---|---|
| Comparative Example 4 | Magnetic layer surface: 2 nm<br>Back layer surface: 3 nm | 0.53 | 97% | Scraping of edge was generated. |
| Comparative Example 5 | Magnetic layer surface: 2 nm<br>Back layer surface: 3 nm | 0.45 | 101% | Scraping of edge was generated. |

Note)
Mag: Magnetic layer,
BB: Back layer

From the results of Table 1, it is noted that since in the magnetic recording medium of the invention, not only the smoothed layer is provided on the both surfaces of the non-magnetic support having an intrinsic viscosity of from 0.47 to 0.51 dL/g, but also the filler is contained in each of the smoothed layers, the magnetic recording medium of the invention is excellent in output characteristics and durability as compared with those of the Comparative Examples.

This application is based on Japanese Patent application JP 2004-215356, filed Jul. 23, 2004, the entire content of which is hereby incorporated by reference, the same as if set forth at length.

What is claimed is:

1. A magnetic recording medium comprising:
    a magnetic layer;
    a first radiation curable resin layer;
    a non-magnetic support having an intrinsic viscosity of from 0.47 to 0.51 dL/g;
    a second radiation curable resin layer; and
    a back layer, in this order,
    wherein the back layer has a surface roughness of from 2 to 5 nm, the magnetic layer has a surface roughness of from 1 to 4 nm, the first radiation curable resin layer contains a filler, and the second radiation curable resin layer contains a filler.

2. The magnetic recording medium according to claim 1, wherein at least one of the first radiation curable resin layer and the second radiation curable resin layer further contains a binder.

3. The magnetic recording medium according to claim 2, wherein at least one of the binder contained in the first radiation curable resin layer and the binder contained in the second radiation curable resin layer has a glass transition temperature of from 0 to 120° C.

4. The magnetic recording medium according to claim 1, wherein at least one of the filler contained in the first radiation curable resin layer and the filler contained in the second radiation curable resin layer has a thickness of from 0.5 to 5 nm.

5. The magnetic recording medium according to claim 1, wherein the first radiation curable resin layer further contains at least one of a polyamide resin, a polyamideimide resin, a polyester resin, a polyurethane resin, a vinyl chloride based resin and an acrylic resin, and the second radiation curable resin layer further contains at least one of a polyamide resin, a polyamideimide resin, a polyester resin, a polyurethane resin, a vinyl chloride based resin and an acrylic resin.

6. The magnetic recording medium according to claim 1, wherein the non-magnetic support comprises polyethylene terephthalate or polyethylene naphthalate.

7. The magnetic recording medium according to claim 1, wherein the non-magnetic support contains 3.0% by weight of a particle having a mean particle size of from 10 nm to 2.0 μm.

8. The magnetic recording medium according to claim 1, wherein at least one of the first radiation curable resin layer and the second radiation curable resin layer further contains a radiation curable compound.

9. The magnetic recording medium according to claim 8, wherein at least one of the first radiation curable resin layer and the second radiation curable resin layer further contains a polymerization initiator.

10. The magnetic recording medium according to claim 1, wherein at least one of the first radiation curable resin layer and the second radiation curable resin layer has a thickness of from 0.3 to 3.0 μm.

11. The magnetic recording medium according to claim 1, wherein at least one of the first radiation curable resin layer and the second radiation curable resin layer has a thickness of from 0.35 to 2.0 μm.

12. The magnetic recording medium according to claim 1, wherein the magnetic layer contains ferromagnetic powder.

13. The magnetic recording medium according to claim 12, wherein the ferromagnetic powder is ferromagnetic hexagonal ferrite powder.

14. The magnetic recording medium according to claim 1, wherein at least one of the first radiation curable resin layer and the second radiation curable resin layer contains a conductive powder or an ionic surfactant.

* * * * *